(12) United States Patent
Zhang et al.

(10) Patent No.: US 12,112,743 B2
(45) Date of Patent: Oct. 8, 2024

(54) SPEECH RECOGNITION METHOD AND APPARATUS WITH CASCADED HIDDEN LAYERS AND SPEECH SEGMENTS, COMPUTER DEVICE, AND COMPUTER-READABLE STORAGE MEDIUM

(71) Applicant: TENCENT TECHNOLOGY (SHENZHEN) COMPANY LIMITED, Shenzhen (CN)

(72) Inventors: Xilin Zhang, Shenzhen (CN); Bo Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 297 days.

(21) Appl. No.: 17/709,011

(22) Filed: Mar. 30, 2022

(65) Prior Publication Data

US 2022/0223142 A1 Jul. 14, 2022

Related U.S. Application Data

(63) Continuation of application No. PCT/CN2020/123738, filed on Oct. 26, 2020.

(30) Foreign Application Priority Data

Jan. 22, 2020 (CN) .......................... 202010074075.X

(51) Int. Cl.
*G10L 15/187* (2013.01)
*G10L 15/02* (2006.01)
(Continued)

(52) U.S. Cl.
CPC ............ *G10L 15/187* (2013.01); *G10L 15/02* (2013.01); *G10L 15/04* (2013.01); *G10L 15/22* (2013.01);
(Continued)

(58) Field of Classification Search
CPC ...................................................... G06N 3/045
See application file for complete search history.

(56) References Cited

U.S. PATENT DOCUMENTS 7,467,087 B1 * 12/2008 Gillick .................... G10L 15/26
704/235
9,202,469 B1 12/2015 Moorjani et al.
(Continued)

FOREIGN PATENT DOCUMENTS

CN 105869624 A 8/2016
CN 106940998 A 7/2017
(Continued)

OTHER PUBLICATIONS

Xue et al. Improving Latency-Controlled BLSTM Acoustic Models for Online Speech Recognition. ICASSP 2017, pp. 5340-5344 (Year: 2017).*
(Continued)

*Primary Examiner* — Jesse S Pullias
(74) *Attorney, Agent, or Firm* — ANOVA LAW GROUP, PLLC

(57) ABSTRACT

A speech recognition method includes: obtaining speech data; performing feature extraction on speech data, to obtain speech features of at least two speech segments; inputting the speech features of the at least two speech segments into the speech recognition model, and processing the speech features of the speech segments by using cascaded hidden layers in the speech recognition model, to obtain hidden layer features of the speech segments, a hidden layer feature of an $i^{th}$ speech segment being determined based on speech features of n speech segments located after the $i^{th}$ speech segment in a time sequence and a speech feature of the $i^{th}$
(Continued)

speech segment; and obtaining text information corresponding to the speech data based on the hidden layer features of the speech segments.

20 Claims, 13 Drawing Sheets

(51) Int. Cl.
    *G10L 15/04*     (2013.01)
    *G10L 15/22*     (2006.01)
    *G10L 25/18*     (2013.01)

(52) U.S. Cl.
    CPC ........ *G10L 25/18* (2013.01); *G10L 2015/025* (2013.01)

(56) References Cited

U.S. PATENT DOCUMENTS

| | | | |
|---|---|---|---|
| 9,620,145 B2* | 4/2017 | Bacchiani | G10L 25/30 |
| 11,367,433 B2* | 6/2022 | Sypniewski | G10L 15/02 |
| 2012/0316875 A1* | 12/2012 | Nyquist | G10L 15/30 704/235 |
| 2015/0032449 A1* | 1/2015 | Sainath | G10L 15/16 704/235 |
| 2018/0277103 A1 | 9/2018 | Wu et al. | |
| 2019/0013009 A1* | 1/2019 | Pinson | G10L 25/30 |
| 2020/0013391 A1* | 1/2020 | Park | G06N 3/044 |
| 2022/0004870 A1 | 1/2022 | Wang et al. | |

FOREIGN PATENT DOCUMENTS

| | | |
|---|---|---|
| CN | 107301864 A | 10/2017 |
| CN | 108417202 A | 8/2018 |
| CN | 109754789 A | 5/2019 |
| CN | 110111775 A | 8/2019 |
| CN | 110189749 A | 8/2019 |
| CN | 110381388 A | 10/2019 |
| CN | 110415702 A | 11/2019 |
| CN | 110600018 A | 12/2019 |
| CN | 110634469 A | 12/2019 |
| WO | 2018071389 A1 | 4/2018 |

OTHER PUBLICATIONS

The World Intellectual Property Organization (WIPO) International Search Report for PCT/CN2020/123738 Jan. 26, 2021 6 Pages (including translation).

Shaofei Xue et al., "Improving Latency-Controlled BLSTM Acoustic Models for Online Speech Recognition," ICASSP 2017, Jun. 19, 2017(Jun. 19, 2017). 5 pages.

China National Intellectual Property Administration (CNIPA) Office Action 1 for 202010074075.X Jun. 21, 2023 14 Pages (including translation).

* cited by examiner

SPEECH RECOGNITION METHOD AND APPARATUS WITH CASCADED HIDDEN LAYERS AND SPEECH SEGMENTS, COMPUTER DEVICE, AND COMPUTER-READABLE STORAGE MEDIUM

RELATED APPLICATION(S)

This application is a continuation application of PCT Patent Application No. PCT/CN2020/123738 filed on Oct. 26, 2020, which claims priority to Chinese Patent Application No. 202010074075.X, entitled "SPEECH RECOGNITION METHOD AND APPARATUS, COMPUTER DEVICE, AND COMPUTER-READABLE STORAGE MEDIUM" and filed with the China National Intellectual Property Administration on Jan. 22, 2020, all of which are incorporated herein by reference in entirety.

FIELD OF THE TECHNOLOGY

The present disclosure relates to the field of speech processing, and in particular, to a speech recognition method and apparatus, a computing device, and a computer-readable storage medium.

BACKGROUND

Speech recognition is a process of converting speech data into text for output. The speech data often has a context correlation, and context information of the speech data can make a recognition result more accurate during speech recognition. When speech recognition is performed on real-time inputted speech data, information is often obtained by using a latency-controlled bidirectional long short-term memory (LC-BLSTM) network. For example, after obtaining the currently inputted speech data, the LC-BLSTM network may perform delay processing, and after obtaining following speech data, the LC-BLSTM recognizes the currently inputted speech data based on the following speech data.

However, to obtain the real-time performance of speech recognition, a delay time is often relatively short, so that following speech data obtained within a delay period is little, for example, only a speech segment of 300 ms to 600 ms can be obtained generally, resulting in fewer following information obtained during speech recognition, affecting the accuracy of a recognition result.

SUMMARY

Embodiments of the present disclosure provide a speech recognition method and apparatus, a computing device, and a computer-readable storage medium, to improve accuracy of a speech recognition structure. The technical solutions are as follows:

In one aspect, the present disclosure provides a speech recognition method, applied to a computing device, where a speech recognition model is set in the computing device, and the method includes: obtaining speech data; performing feature extraction on the speech data, to obtain speech features of at least two speech segments in the speech data; inputting the speech features of the at least two speech segments into the speech recognition model, and processing the speech features of the speech segments by using n cascaded hidden layers in the speech recognition model, to obtain hidden layer features of the speech segments, a hidden layer feature of an $i^{th}$ speech segment being determined based on speech features of n speech segments located after the $i^{th}$ speech segment in a time sequence and a speech feature of the $i^{th}$ speech segment; and obtaining text information corresponding to the speech data based on the hidden layer features of the speech segments.

In another aspect, the present disclosure provides a speech recognition apparatus, a speech recognition model being set in the apparatus, and the apparatus including: a memory storing computer program instructions; and a processor coupled to the memory and configured to execute the computer program instructions and perform: obtaining speech data; performing feature extraction on the speech data, to obtain speech features of at least two speech segments in the speech data; inputting the speech features of the at least two speech segments into the speech recognition model, and processing the speech features of the speech segments by using n cascaded hidden layers in the speech recognition model, to obtain hidden layer features of the speech segments, a hidden layer feature of an $i^{th}$ speech segment being determined based on speech features of n speech segments located after the $i^{th}$ speech segment in a time sequence and a speech feature of the $i^{th}$ speech segment, and both n and i being positive integers; and obtaining text information corresponding to the speech data based on the hidden layer features of the speech segments.

In yet another aspect, the present disclosure provides a non-transitory computer-readable storage medium storing computer program instructions executable by at least one processor to perform: obtaining speech data; performing feature extraction on the speech data, to obtain speech features of at least two speech segments in the speech data; inputting the speech features of the at least two speech segments into the speech recognition model, and processing the speech features of the speech segments by using n cascaded hidden layers in the speech recognition model, to obtain hidden layer features of the speech segments, a hidden layer feature of an $i^{th}$ speech segment being determined based on speech features of n speech segments located after the $i^{th}$ speech segment in a time sequence and a speech feature of the $i^{th}$ speech segment, and both n and i being positive integers; and obtaining text information corresponding to the speech data based on the hidden layer features of the speech segments.

In yet another aspect, the present disclosure provides a speech recognition method, applied to a terminal, the method including: obtaining real-time inputted speech data in response to a speech input instruction; performing fragmentation on the speech data, to obtain at least one speech fragment; obtaining text information corresponding to the speech fragments, the text information being obtained by using the speech recognition method according to the above aspect; and displaying the text information in a target page in response to a speech input completion instruction.

The technical solutions provided in the embodiments of the present disclosure produce at least the following beneficial effects:

Speech features of at least two speech segments are extracted from speech data, and then the speech features of the speech segments are learned and recognized by invoking a speech recognition model, a hidden layer feature of each speech segment being obtained by learning based on features of subsequent speech segments, so that the hidden layer feature of the speech segment learns following information, and finally recognized text information is more smooth in language expression and more accurate in semantics, thereby improving the accuracy of speech recognition.

Other aspects of the present disclosure can be understood by those skilled in the art in light of the description, the claims, and the drawings of the present disclosure.

BRIEF DESCRIPTION OF THE DRAWINGS

To facilitate a better understanding of technical solutions of certain embodiments of the present disclosure, accompanying drawings are described below. The accompanying drawings are illustrative of certain embodiments of the present disclosure, and a person of ordinary skill in the art may still derive other drawings from these accompanying drawings without having to exert creative efforts. When the following descriptions are made with reference to the accompanying drawings, unless otherwise indicated, same numbers in different accompanying drawings may represent same or similar elements. In addition, the accompanying drawings are not necessarily drawn to scale.

DETAILED DESCRIPTION

Figure 1:
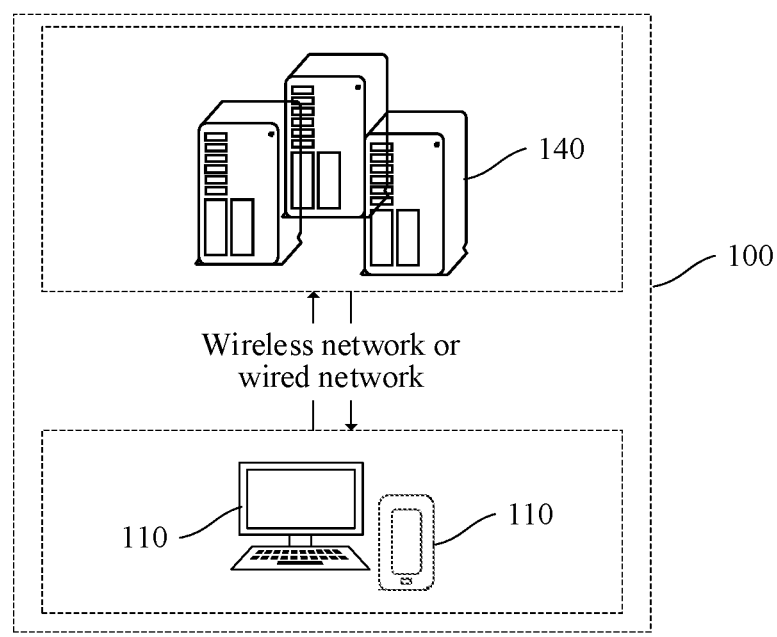
FIG. 1 is a schematic diagram of a speech recognition system according to embodiment(s) of the present disclosure.

To make objectives, technical solutions, and/or advantages of the present disclosure more comprehensible, certain embodiments of the present disclosure are further elaborated in detail with reference to the accompanying drawings. The embodiments as described are not to be construed as a limitation to the present disclosure. All other embodiments obtained by a person of ordinary skill in the art without creative efforts shall fall within the protection scope of embodiments of the present disclosure.

Throughout the description, and when applicable, "some embodiments" or "certain embodiments" describe subsets of all possible embodiments, but it may be understood that the "some embodiments" or "certain embodiments" may be the same subset or different subsets of all the possible embodiments, and can be combined with each other without conflict.

In certain embodiments, the term "based on" is employed herein interchangeably with the term "according to."

First, several terms involved in the present disclosure are explained.

Artificial Intelligence (AI) is a theory, a method, a technology, and an implementation system that use a digital computer or a machine controlled by the digital computer to simulate, extend, and expand human intelligence, perceive an environment, obtain knowledge, and use knowledge to obtain an optimal result. In other words, AI is a comprehensive technology in computer science and attempts to understand essence of intelligence and produce a new intelligent machine that can react in a manner similar to human intelligence. AI is to study the design principles and implementation methods of various intelligent machines, to enable the machines to have the functions of perception, reasoning, and decision-making.

The AI technology is a comprehensive discipline, and relates to a wide range of fields including both hardware-level technologies and software-level technologies. The basic AI technologies generally include technologies such as a sensor, a dedicated AI chip, cloud computing, distributed storage, a big data processing technology, an operating/interaction system, and electromechanical integration. AI software technologies include several directions such as a computer vision (CV) technology, a speech technology, a natural language processing technology, and machine learning/deep learning. The technical solution provided in the embodiments of the present disclosure relates to the speech technology, the machine learning, and the like.

Key technologies of the speech technology include an automatic speech recognition (ASR) technology, a text-to-speech (TTS) technology, and a voiceprint recognition technology. To make a computer capable of listening, seeing, speaking, and feeling is the future development direction of human-computer interaction, and speech interaction has become one of the most promising human-computer interaction methods in the future. The technical solution provided in the embodiments of the present disclosure relates to the ASR technology. Speech data is converted into text information by using the ASR technology.

Streaming speech recognition, also referred to as online speech recognition, is a decoding process for speech recognition while receiving speech data in a streaming manner. A streaming speech recognition technology is applied, text content can be immediately fed back when a user expresses the content, and the interaction is in real time, so that the technology is suitable for online speech listen/write.

Speech feature is a feature extracted from inputted speech data by using some signal processing technologies and is represented as a feature vector for an acoustic model to process, to reduce impacts of factors such as environment noise, channel, a speaker on recognition as much as possible. In the present disclosure, a feature of speech data in a frequency spectrum dimension is extracted as a speech feature.

FIG. 1 is a schematic diagram of a speech recognition system 100 according to an embodiment of the present disclosure. Referring to FIG. 1, the speech recognition system 100 includes a terminal 110 and a speech recognition platform 140.

The terminal 110 is connected to the speech recognition platform 140 through a wireless network or a wired network. The terminal 110 may be at least one of a smartphone, a game console, a desktop computer, a tablet computer, an ebook reader, a Moving Picture Experts Group Audio Layer III (MP3) player, a Moving Picture Experts Group Audio Layer IV (MP4) player, or a laptop computer. An application that supports speech input and speech recognition is installed and run on the terminal 110. The application may be a social application, an instant messaging application, or the like. For example, the terminal 110 is a terminal used by a user, and the application program running on the terminal 110 logs in to a user account.

The speech recognition platform 140 includes at least one of a server, a plurality of servers, a cloud computing platform, or a virtualization center. The speech recognition platform 140 is configured to provide a background service for the application that supports speech recognition. In certain embodiment(s), the speech recognition platform 140 is in charge of primary speech recognition, and the terminal 110 is in charge of secondary speech recognition. Alternatively, the speech recognition platform 140 is in charge of secondary speech recognition, and the terminal 110 is in charge of primary speech recognition. Alternatively, the speech recognition platform 140 or the terminal 110 may be in charge of speech recognition alone.

In certain embodiment(s), the speech recognition platform 140 includes an access server, a speech recognition server, and a database. The access server is configured to provide an access service for the terminal 110. The speech recognition server is configured to provide a background service related to speech recognition. There may be one or more speech recognition servers. When there are a plurality of speech recognition servers, at least two speech recognition servers are configured to provide different services, and/or at least two speech recognition servers are configured to provide the same service, for example, provide the same service in a load balancing manner. This is not limited in this embodiment of the present disclosure. A speech recognition model, a language model, and the like may be set in the speech recognition server.

The terminal 110 may generally refer to one of a plurality of terminals. In this embodiment, the terminal 110 is merely used as an example for description.

A person skilled in the art may learn that there may be more or fewer terminals. For example, there may be only one terminal, or there may be dozens of or hundreds of or more terminals. In this implementation, the speech recognition system further includes another terminal. The quantity and the device type of the terminals are not limited in the embodiments of the present disclosure.

Figure 2:
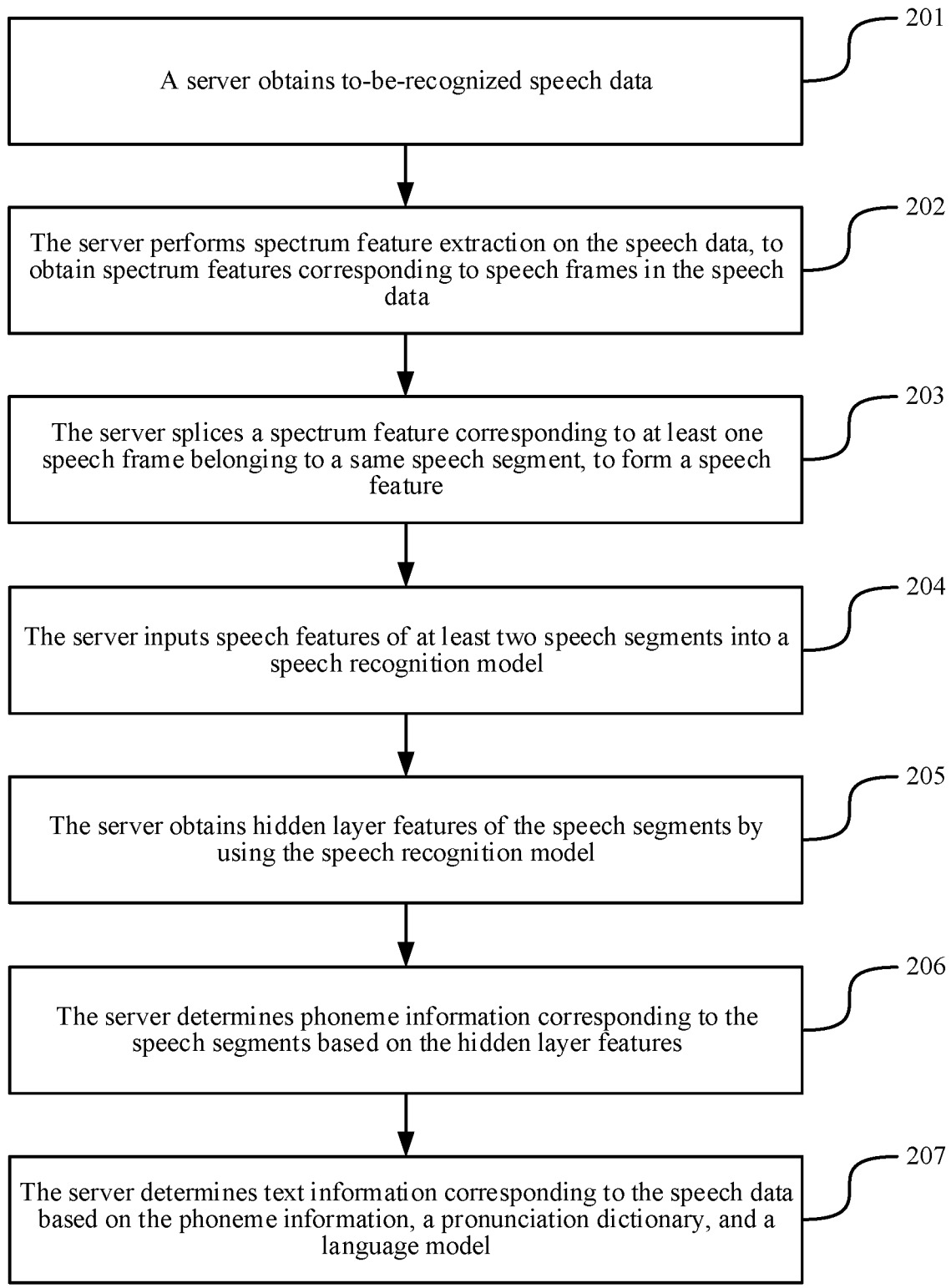
FIG. 2 is a schematic flowchart of a speech recognition method according to embodiment(s) of the present disclosure.

FIG. 2 is a flowchart of a speech recognition method according to an embodiment of the present disclosure. The method is applied to the terminal or the server. In this embodiment of the present disclosure, the speech recognition method is described by using the server as an execution body. Referring to FIG. 2, this embodiment may include the following steps.

201. A server obtains to-be-recognized speech data.

In certain embodiment(s), the term "to-be-recognized data" refers to and is interchangeable with "speech data."

The speech data may be speech data inputted by a user in real time, or may be a segment of speech data stored in the server, or may be a segment of speech data captured from an audio file or a video file. Specific speech data is not limited in this embodiment of the present disclosure.

In this embodiment of the present disclosure, the server may be a back-end server of a target application. The target application may support speech input, for example, the target application may be an instant messaging application. In certain embodiment(s), when a user performs speech input by using the target application on any terminal, the terminal may obtain speech data inputted by the user in real time and send the speech data to the server after performing processing such as fragmentation and packaging on the speech data, and the server performs subsequent speech recognition steps.

After obtaining the to-be-recognized speech data, the server performs feature extraction on the speech data, to obtain speech features of at least two speech segments in the speech data as input data of a speech recognition model. The speech features of the at least two speech segments may be obtained through extraction in the following step 202 and step 203.

202. The server performs spectrum feature extraction on the speech data, to obtain spectrum features corresponding to speech frames in the speech data.

The spectrum feature may be used for indicating change information of the speech data in a frequency domain. The server may alternatively extract a feature in another dimension of the speech data. This is not limited in this embodiment of the present disclosure. In this embodiment of the present disclosure, extraction of a spectrum feature is used as an example for description. In certain embodiment(s), a process of obtaining the spectrum feature may include the following steps.

Step 1. The server preprocesses the speech data.

In this embodiment of the present disclosure, the preprocessing process may include processing processes such as pre-emphasis, framing, and windowing. The preprocessing process may reduce impacts of factors such as aliasing, high-order harmonic wave distortion, and a high frequency caused by vocal organs and a speech signal acquisition device on quality of the speech data.

In certain embodiment(s), first, the server may perform pre-emphasis on the speech data. For example, the server may perform pre-emphasis on the speech data by using a high-pass filter, to emphasize a high frequency part of the speech data, so as to increase a high-frequency resolution, facilitating subsequent feature extraction. Subsequently, the server may perform framing on the speech data according to a target duration, to obtain a plurality of speech frames of the speech data. The target duration may be set by a developer, which is not limited in this embodiment of the present disclosure. In this embodiment of the present disclosure, a frame shift of each speech frame may be 10 ms. Finally, the server may perform windowing on the speech frames, to enhance a continuity between each speech frame and a previous speech frame as well as a next speech frame. For example, windowing may be performed on the speech frames by using a window function such as a Hamming window.

The description of the speech data preprocessing process is merely an exemplary description. A specific preprocessing method is not limited in this embodiment of the present disclosure.

Step 2. The server performs spectrum feature extraction on the preprocessed speech data.

In this embodiment of the present disclosure, the server may obtain mel-frequency cepstrum coefficients (MFCC) of the speech data.

In certain embodiment(s), first, the server may perform fast Fourier transform (FTT) on the speech frames, to obtain energy distribution information of the speech frames in the frequency domain, that is, obtain frequency spectra of the speech frames. The server may obtain power spectra of the speech frames based on the frequency spectra. For example, model squares of the frequency spectra of the speech frames may be solved, to obtain the power spectra. Subsequently, the server may pass the power spectra of the frames through N filter banks in a Mel scale, one filter bank including M triangular filters, and the server may obtain output results of the filter banks and calculate logarithmic energy of the output results. Both N and M are positive integers, and specific values of N and M may be set by the developer. This is not limited in this embodiment of the present disclosure. Finally, the server may perform discrete cosine transform on the logarithmic energy, to obtain the MFCCs, the MFCCs being used as spectrum features of the speech data.

The description of the MFCC obtaining method is merely an exemplary description, which is not limited in this embodiment of the present disclosure.

In certain embodiment(s), the spectrum features of the speech data may further include change information of the MFCCs. For example, the server may further calculate a differential spectrum between MFCCs of the speech frames, to obtain a first difference parameter and a second difference parameter. The spectrum feature is determined based on an MFCC of one speech frame, the first difference parameter, and the second difference parameter. The MFCC may be used for indicating static features of the speech data, a differential spectrum between the static features may be used for indicating dynamic features of the speech data, and the accuracy of a speech recognition result can be improved by combining the static feature and the dynamic feature. In certain embodiment(s), the server may further obtain volume information of the speech frames, that is, calculate frame energy of the speech frames, and add the frame energy to the spectrum feature. The spectrum feature may further include information in another dimension, which is not limited in this embodiment of the present disclosure.

The description of the spectrum feature obtaining method is merely an exemplary description. A specific spectrum feature obtaining method is not limited in this embodiment of the present disclosure.

203. The server splices a spectrum feature corresponding to at least one speech frame belonging to a same speech segment, to form a speech feature.

A speech segment may include a plurality of speech frames in the speech data, and a specific quantity of speech frames may be set by the developer, which is not limited in this embodiment of the present disclosure. In certain embodiment(s), the server may divide the speech data according to a preset duration, to obtain a plurality of speech segments. One speech segment may include a plurality of speech frames, and a speech feature of the speech segment may be formed by spectrum features of the speech frames. The preset duration may be set by the developer, which is not limited in this embodiment of the present disclosure. For example, the preset duration is set to 600 ms, and a duration of each speech frame is 10 ms. Each speech segment obtained by the server may include 60 speech frames When a quantity of speech frames in a lastest speech segment is less than 60, the server may duplicate a lastest speech frame, and add a duplicated speech frame after the lastest speech frame, to supplement data of the lastest speech segment. In certain embodiment(s), the server may further combine the plurality of speech frames into one intermediate frame, for example, combine three speech frames into one intermediate frame, a duration of each intermediate frame being 30 ms, and each speech segment of 600 ms including 20 intermediate frames. When a quantity of intermediate frames included in a lastest speech segment is not sufficient, the server may duplicate a lastest intermediate frame, and add a duplicated intermediate frame after the lastest intermediate frame, to supplement data of the lastest speech segment. A specific speech segment determining method is not limited in this embodiment of the present disclosure. In this embodiment of the present disclosure, a description is made by using an example in which the speech segment includes a plurality of intermediate frames.

In this embodiment of the present disclosure, spectrum features corresponding to the speech frames may be spliced based on a time sequence of the speech frames, to obtain a speech feature. For example, when the spectrum feature is represented as a vector, the vectors may be connected in a head-to-tail manner according to the time sequence of the speech frames, to obtain a high-dimensional vector as the speech feature. The server may further perform feature splicing by using another method, which is not limited in this embodiment of the present disclosure.

In this embodiment of the present disclosure, the speech feature of the speech segment is obtained through feature splicing. In a subsequent speech recognition process, the plurality of speech frames of the speech segment are processed synchronously in a unit of a speech segment, to improve the speech recognition efficiency.

Key information of the speech data is extracted in step 202 and step 203 by feature extraction, and the key information is used in a subsequent recognition process in the form of feature, to ensure an accurate recognition result.

204. The server inputs speech features of at least two speech segments into a speech recognition model.

A speech recognition model is set in the server. The speech recognition model may further perform feature extraction on a speech segment based on speech features of a plurality of speech segments after the speech segment, so that a feature of the speech segment may be fused with information about the plurality of speech segments after the speech segment. For example, when performing feature extraction on a speech segment by using the speech recognition model, the server may obtain features of a plurality of speech segments located after the speech segment in a time sequence and perform a weighting operation on the features of the plurality of speech segments and a feature of the speech segment, so that an output result corresponding to the speech segment may be fused with the features of the plurality of speech segments after the speech segment.

Figure 3:
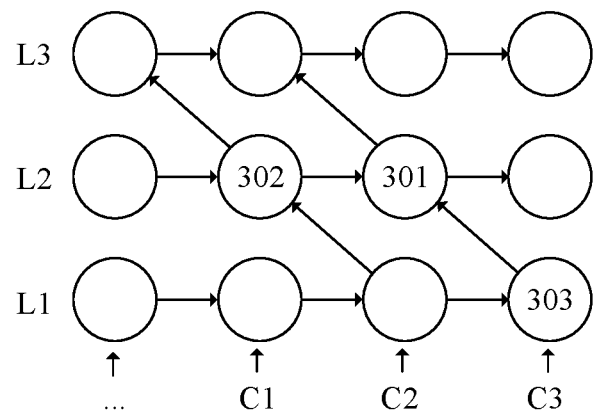
FIG. 3 is a schematic structural diagram in which a speech recognition model is expanded in a time sequence according to embodiment(s) of the present disclosure.

In certain embodiment(s), the speech recognition model may be a model constructed based on a tri-latency-controlled bidirectional long short-term memory (TLC-BLSTM) network. The speech recognition model may include a plurality of hidden layers, one hidden layer may be formed by one TCL-BLSTM network, one hidden layer may include a plurality of hidden layer units, and each hidden layer unit may memorize each input information, the input information being stored inside a network and being used in a current operation process. In this embodiment of the present disclosure, for any hidden layer unit in one hidden layer, a weighting operation may be performed based on current input information, an operation result of a previous hidden layer unit in the current hidden layer, and an operation result of a hidden layer unit in a previous hidden layer, to obtain a feature corresponding to the current input information. FIG. 3 is a schematic structural diagram in which a speech recognition model is expanded in a time sequence according to an embodiment of the present disclosure. The speech recognition model may include hidden layers L1, L2, and L3, and input information of the speech recognition model is C1, C2, and C3. For a hidden layer unit 301 in the hidden layer L2, the hidden layer unit 301 may obtain a feature corresponding to C2 based on an operation result of a previous hidden layer unit 302 in the current hidden layer L2 and an operation result of a hidden layer unit 303 in the previous hidden layer L1.

In this embodiment of the present disclosure, the speech recognition model constructed based on the TLC-BLSTM network may support recognition and decoding of a speech fragment and support implementation of streaming speech recognition. The TLC-BLSTM network adds modeling of reverse recognition based on forward recognition, to effectively improve the robustness of the speech recognition model. Secondly, in the TLC-BLSTM network, a tri-field of view method is used. As shown in an information transmission path in FIG. 3, a transmission path of an operation result of each hidden layer unit may be used as a bevel edge of a triangle. Through such a tri-field of view method, a field of view of a reverse LSTM is expanded, and following information is obtained under speech segments of the same size. Table 1 is a performance comparison table of a speech recognition model according to an embodiment of the present disclosure. Table 1 shows performance information of models respectively constructed based on a long short-term memory (LSTM) network, a bidirectional long short-term memory (BLSTM) network, a latency-controlled bidirectional long short-term memory (LC-BLSTM) network, and the TLC-BLSTM network of the speech recognition model, and performance comparison information between two dimensions of real-time performance and robustness is shown in Table 1.

TABLE 1

| Model | LSTM | BLSTM | LC-BLSTM | TLC-BLSTM |
|---|---|---|---|---|
| Real-time performance | Strong | Weak | Strong | Strong |
| Robustness | Weak | Strong | Medium | Strong |

Based on the information in Table 1, when the speech recognition model is the model constructed based on the TLC-BLSTM network, real-time speech recognition may be well supported, that is, a streaming operation is supported. In addition, a field of view of a speech signal can be effectively widened based on the characteristics of the TLC and a speech feature is gradually mapped and modeled from wide to narrow, thereby effectively taking the robustness of the model into account while ensuing the real-time performance.

205. The server obtains hidden layer features of the speech segments by using the speech recognition model.

In this embodiment of the present disclosure, the server may process the speech features of the speech segments by using the hidden layers in the speech recognition model, to obtain hidden layer features.

In certain embodiment(s), for a first hidden layer in the speech recognition model, a speech feature of any speech segment and a speech feature of a next speech segment of the any speech segment are inputted into the first hidden layer, to output an initial hidden layer feature corresponding to the any speech segment. For any intermediate hidden layer in the speech recognition model, the initial hidden layer feature of the any speech segment and an initial hidden layer feature of the next speech segment of the any speech segment are inputted into the intermediate hidden layer, to output an intermediate hidden layer feature corresponding to the any speech segment. For a lastest hidden layer in the speech recognition model, the intermediate hidden layer feature of the any speech segment and an intermediate hidden layer feature of the next speech segment of the any speech segment are inputted into the lastest hidden layer, to output a hidden layer feature corresponding to the any speech segment.

That is, the server inputs speech features of at least two speech segments into the speech recognition model. A speech feature of an $i^{th}$ speech segment and a speech feature of an $(i+1)^{th}$ speech segment are inputted into a first hidden layer in the speech recognition model, to output an initial hidden layer feature of the $i^{th}$ speech segment. The initial hidden layer feature of the $i^{th}$ speech segment and an initial hidden layer feature of the $(i+1)^{th}$ speech segment are inputted into a first intermediate hidden layer in the speech recognition model, to output a first intermediate hidden layer feature of the $i^{th}$ speech segment. The initial hidden layer feature of the $(i+1)^{th}$ speech segment is obtained by the first hidden layer through an operation based on the speech feature of the $(i+1)^{th}$ speech segment and a speech feature of an $(i+2)^{th}$ speech segment. A $j^{th}$ intermediate hidden layer feature of the $i^{th}$ speech segment and a $j^{th}$ intermediate hidden layer feature of the $(i+1)^{th}$ speech segment are inputted into a $(j+1)^{th}$ intermediate hidden layer in the speech recognition model, to output a $(j+1)^{th}$ intermediate hidden layer feature of the $i^{th}$ speech segment. The $j^{th}$ intermediate hidden layer feature of the $(i+1)^{th}$ speech segment is obtained by the $j^{th}$ intermediate hidden layer through an operation based on a $(j-1)^{th}$ intermediate hidden layer feature of the $(i+1)^{th}$ speech segment and a $(j-1)^{th}$ intermediate hidden layer feature of the $(i+2)^{th}$ speech segment. A lastest intermediate hidden layer feature of the $i^{th}$ speech segment is inputted into a lastest hidden layer in the speech recognition model, to output a hidden layer feature of the $i^{th}$ speech segment. i and j are positive integers, and a $0^{th}$ intermediate hidden layer feature is the initial hidden layer feature.

For any hidden layer in the speech recognition model, the server may perform a forward operation on a feature of the any speech segment by using the any hidden layer, to obtain a first feature; perform a reverse operation on the feature of the any speech segment and a feature of the next speech segment by using the any hidden layer, to obtain a second feature; and splice the first feature and the second feature, to obtain a feature outputted by the any hidden layer.

That is, the server inputs a feature of the $i^{th}$ speech segment into a $k^{th}$ hidden layer in the speech recognition model, and performs a forward operation on the feature of the $i^{th}$ speech segment by using the $k^{th}$ hidden layer, to obtain a first feature; performs a reverse operation on the feature of the $i^{th}$ speech segment and a feature of the $(i+1)^{th}$ speech segment by using the $k^{th}$ hidden layer, to obtain a second feature; and splices the first feature and the second feature, to obtain a feature outputted by the $k^{th}$ hidden layer, k being a positive integer.

In certain embodiment(s), the second feature may be obtained by the server based on all intermediate frames in any speech segment and some intermediate frames in a next speech segment. For example, the server may obtain a second target quantity of speech frames from the next speech segment, and perform a reverse operation on a feature corresponding to the any speech segment and features corresponding to the second target quantity of speech frames by using the any hidden layer, to obtain the second feature. A value of the second target quantity is less than or equal to a total quantity of speech frames included in one speech segment, and the value of the second target quantity may be set by the developer. This is not limited in this embodiment of the present disclosure.

That is, the server obtains a second target quantity of speech frames from the $(i+1)^{th}$ speech segment; and performs a reverse operation on the feature corresponding to the $i^{th}$ speech segment and features corresponding to the second target quantity of speech frames by using the $k^{th}$ hidden layer, to obtain the second feature.

Figure 4:
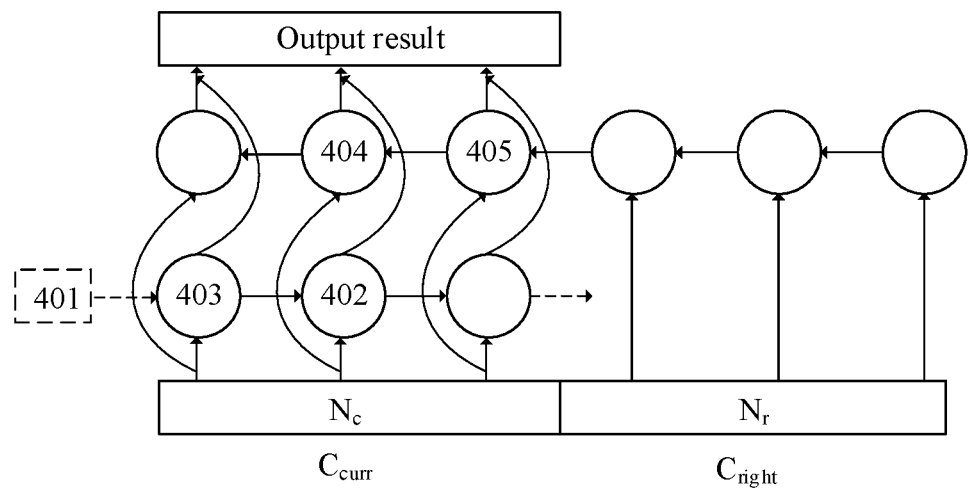
FIG. 4 is a schematic diagram of a hidden layer feature extraction principle according to embodiment(s) of the present disclosure.

In certain embodiment(s), a process of extracting the hidden layer feature is described by using the first hidden layer in the speech recognition model as an example. In this embodiment of the present disclosure, any speech segment may be recorded as $C_{curr}$, a speech segment located after the speech segment $C_{curr}$ in a time sequence may be recorded as $C_{right}$, and each of the speech segment $C_{curr}$ and the speech segment $C_{right}$ may include $N_c$ intermediate frames. $N_c$ is a positive integer, and a specific value thereof may be set by the developer. FIG. 4 is a schematic diagram of a hidden layer feature extraction principle according to an embodiment of the present disclosure. In certain embodiment(s), the server may obtain a first feature 401 corresponding to a previous speech segment of the speech segment $C_{curr}$, and a hidden layer unit in the first hidden layer performs a forward operation on the speech segment $C_{curr}$ based on the first feature 401. In certain embodiment(s), a hidden layer unit may include a plurality of sub-hidden layer units. The sub-hidden layer units perform the forward operation on a speech feature corresponding to the speech segment $C_{curr}$. One sub-hidden layer unit may obtain an operation result of a previous sub-hidden layer unit, for example, a sub-hidden layer unit 402 may obtain an operation result of a previous sub-hidden layer unit 403. The server may obtain an operation result of a lastest sub-hidden layer unit as a first feature of the speech segment $C_{curr}$. In certain embodiment(s), the server may obtain first $N_r$ intermediate frames of the speech segment $C_{right}$ and splice the $N_c$ intermediate frames of the speech segment $C_{curr}$ and the first $N_r$ intermediate frames according to a time sequence, to obtain a speech segment $C_{merge}$. $N_r$ is a positive integer, $N_r$ is less than or equal to $N_c$, and a specific value thereof may be set by the developer. The server performs a reverse LSTM operation on $N_c+N_r$ frames of the speech segment $C_{merge}$ by using the plurality of sub-hidden layer units. That is, one sub-hidden layer unit may obtain an operation result of a next sub-hidden layer unit, for example, a hidden layer unit 404 may obtain an operation result of a next sub-hidden layer unit 405. The server may obtain an output result of the first sub-hidden layer unit as a second feature of the speech segment $C_{curr}$.

In this embodiment of the present disclosure, the server may splice the first feature and the second feature according to a target sequence. For example, when both the first feature and the second feature are represented as vectors, the server may splice the two vectors to obtain a higher-dimensional vector. The server may alternatively assign different weights to the first feature and the second feature and splice the weighted first feature and the weighted second feature. A specific feature splicing manner is not limited in this embodiment of the present disclosure.

The description of the hidden layer feature obtaining method is merely an exemplary description. A specific method for obtaining the hidden layer features of the speech frames is not limited in this embodiment of the present disclosure.

Step 204 and step 205 are implemented by a step of inputting speech features of the at least two speech segments into the speech recognition model, and processing or sequentially processing the speech features of the speech segments by using n cascaded hidden layers in the speech recognition model, to obtain hidden layer features of the speech segments, one hidden layer feature of one speech segment being determined based on speech features of n speech segments located after the speech segment in a time sequence and a speech feature of the speech segment, that is, a hidden layer feature of an $i^{th}$ speech segment being determined based on speech features of n speech segments located after the $i^{th}$ speech segment in a time sequence and a speech feature of the $i^{th}$ speech segment. n is a positive integer, and n is also a quantity of hidden layers in the speech recognition model and may be set by the developer. This is not limited in this embodiment of the present disclosure. For example, when the speech recognition model includes three hidden layers, a hidden layer feature of a speech segment may be determined based on information about three speech segments after the speech segment. The three speech segments after the speech segment may further include information about another speech segment, which is not limited in this embodiment of the present disclosure. In this embodiment of the present disclosure, when speech recognition is performed on a speech segment, a reverse operation is performed by using a plurality of cascaded hidden layers, and features of a plurality of speech segments after the speech segment may be obtained, to recognize the current speech segment with reference to following information, thereby improving the accuracy of a recognition result.

206. The server determines phoneme information corresponding to the speech segments based on the hidden layer features.

Figure 5:
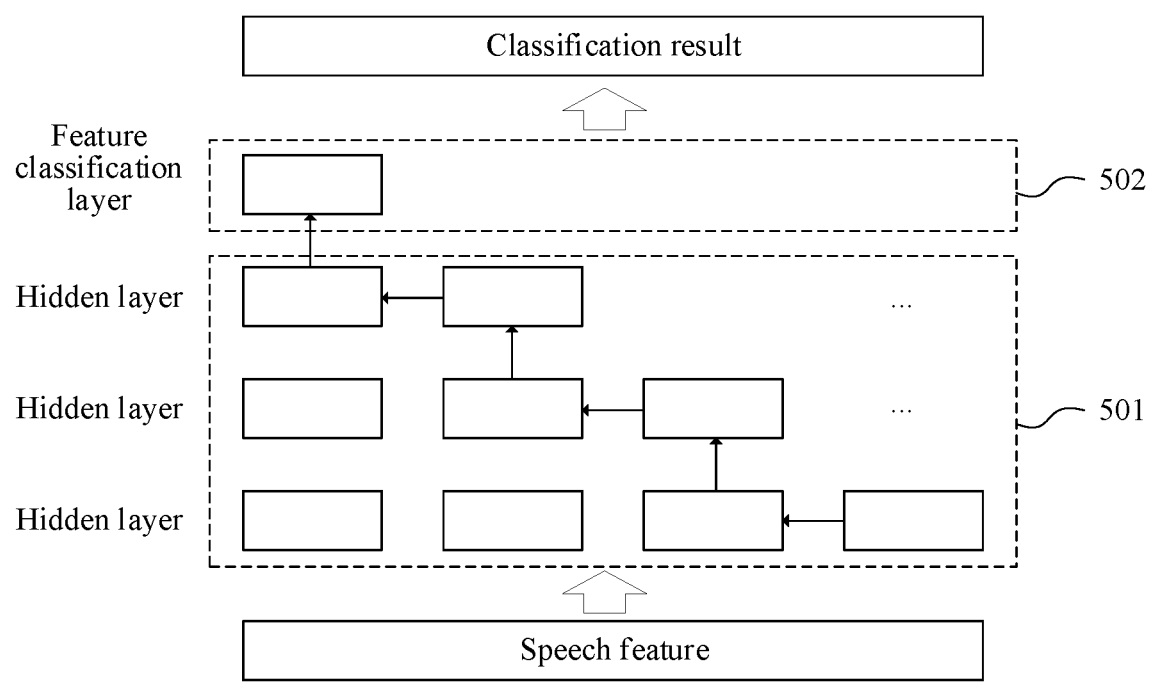
FIG. 5 is a schematic diagram of a speech recognition model according to embodiment(s) of the present disclosure.

In this embodiment of the present disclosure, the speech recognition model may further include a feature classification layer. The feature classification layer may be used for classifying hidden layer features of speech segments, to obtain phoneme information corresponding to the speech segments, that is, obtain probability values of phonemes corresponding to the speech segments. In certain embodiment(s), the feature classification layer may be constructed based on a connected layer and a softmax function (a logistic regression function). The server may input a hidden layer feature of a speech segment into the connected layer, map the hidden layer feature to a vector based on a weight parameter of the connected layer, and then map elements in the vector to values between 0 and 1 by using the softmax function, to obtain a probability vector, an element in the probability vector indicating a probability value of a phoneme corresponding to the speech segment. The server may obtain probability vectors corresponding to the speech segments as the phoneme information. FIG. 5 is a schematic diagram of a speech recognition model according to an embodiment of the present disclosure. After an input speech feature is operated by using a plurality of hidden layers 501, the server may input an operation result into a feature classification layer 502, and the feature classification layer 502 outputs a classification result.

The description of the phoneme information obtaining method is merely an exemplary description. A specific method for obtaining the phoneme information is not limited in this embodiment of the present disclosure.

207. The server determines text information corresponding to the speech data based on the phoneme information, a pronunciation dictionary, and a language model.

A pronunciation dictionary and a language model are set in the server. The pronunciation dictionary is used for indicating a mapping relationship between phonemes and pronunciations, and the language model is used for determining probability values corresponding to phrases forming the text information.

In certain embodiment(s), before determining text information based on the phoneme information, the server may further process the phoneme information, to improve the accuracy of speech-to-text. For example, the server may perform forward decoding based on a Bayes formula, an initial probability matrix and a transition probability matrix of a hidden markov model (HMM), and a probability vector corresponding to a speech segment, to obtain a hidden state sequence corresponding to the inputted speech segment. A specific process of forward decoding is not limited in this embodiment of the present disclosure.

The server may obtain the text information based on the hidden state sequence, the pronunciation dictionary, and the language model. In certain embodiment(s), the server may construct a weighted finite state transducer (WFST) network based on the pronunciation dictionary, the language model, and the like. The WFST network may obtain a character combination corresponding to the speech segment based on input information, output information and a weight value of input-to-output. The input information may be the hidden state sequence corresponding to the speech segment, and the output information may be a character corresponding to a phoneme.

Step 206 and step 207 are a step of obtaining text information corresponding to the speech data based on the hidden layer features of the speech segments. The description of obtaining the text information based on the hidden layer features is merely an exemplary description, which is not limited in this embodiment of the present disclosure.

In the method, text information corresponding to a speech segment is determined based on a plurality of speech segments after the speech segment, and following information is obtained during speech recognition, to improve the accuracy of speech recognition.

The solutions may be combined in any suitable order to form embodiments of the present disclosure, and details are not described herein again.

The technical solution provided in the embodiments of the present disclosure are as follows: to-be-recognized speech data is obtained; feature extraction is performed on the speech data, to obtain speech features of at least two speech segments in the speech data; the speech features of the at least two speech segments are inputted into a speech recognition model, and the speech features of the speech segments are processed or sequentially processed by using n cascaded hidden layers in the speech recognition model, to obtain hidden layer features of the speech segments, a hidden layer feature of a speech segment being determined based on n speech segments located after the speech segment in a time sequence; and finally, text information corresponding to the speech data is obtained based on the hidden layer features of the speech segments.

According to the method, speech features of at least two speech segments are extracted from speech data, and then the speech features of the speech segments are learned and recognized by invoking a speech recognition model, a hidden layer feature of each speech segment being obtained by learning based on features of subsequent speech segments, so that the hidden layer feature of the speech segment learns following information, and finally recognized text information is more smooth in language expression and more accurate in semantics, thereby improving accuracy of speech recognition. According to the method, information of a preceding part is further learned by performing a forward operation on signal frames in a speech segment, so that text information recognized based on context information is more accurate, thereby further improving the accuracy of speech recognition.

Figure 6:
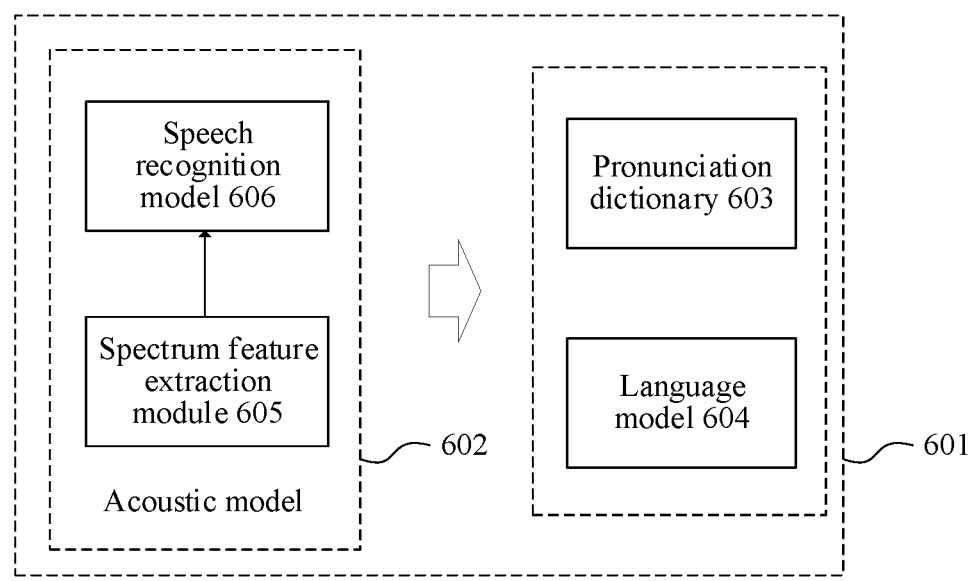
FIG. 6 is a schematic structural diagram of a decoder according to embodiment(s) of the present disclosure.

In this embodiment of the present disclosure, a spectrum feature extraction module and the speech recognition model may form an acoustic model, the acoustic model, the pronunciation dictionary, and the language model may form a decoder, and streaming speech data may be recognized by using the decoder. FIG. 6 is a schematic structural diagram of a decoder 601 according to an embodiment of the present disclosure. The decoder 601 may include an acoustic model 602, a pronunciation dictionary 603, and a language model 604, and the acoustic model 602 may include a spectrum feature extraction module 605 and a speech recognition model 606. According to the technical solution provided in this embodiment of the present disclosure, the speech recognition model is constructed based on the TLC-BLSTM network, to implement streaming speech recognition and stably output a speech recognition service with a high recognition rate and low delay. Table 2 shows a speech recognition effect of models respectively constructed based on LSTM, BLSTM, LC-BLSTM, and TLC-BLSTM of the speech recognition model, including a delay time and a character error rate. The character error rate may represent a quantity of error characters recognized from every 100 characters, and the character error rate is average performance of the solution under a plurality of clean and noisy test sets.

TABLE 2

| Model | LSTM | BLSTM | LC-BLSTM | TLC-BLSTM |
|---|---|---|---|---|
| Delay time | 150 ms | Unsupported streaming | 250 ms | 300 ms |
| Character error rate | 14.47 | 12.05 | 12.5 | 12.06 |

Based on the information displayed in Table 2, the technical solution provided in this embodiment of the present disclosure not only supports streaming speech recognition and but also has a low delay less than 500 ms similar to another solution such as LSTM and LC-BLSTM supporting streaming speech recognition. In addition, this solution has a similar effect to the BLSTM model in terms of character error rate and is smaller than the LSTM and the LC-BLSTM. This solution can implement a stable and low-delay output and achieve an accurate recognition result.

The speech recognition method is described in the embodiments. In this embodiment of the present disclosure, a display device may be disposed on the server. The server may display the text information corresponding to the speech data in a target page of the display device. The server may alternatively send the text information corresponding to the speech data to a user terminal, and display the text information corresponding to the speech data in a target page of the user terminal. The target page may be a session page, a search page, or the like, which is not limited in this embodiment of the present disclosure.

Figure 7:
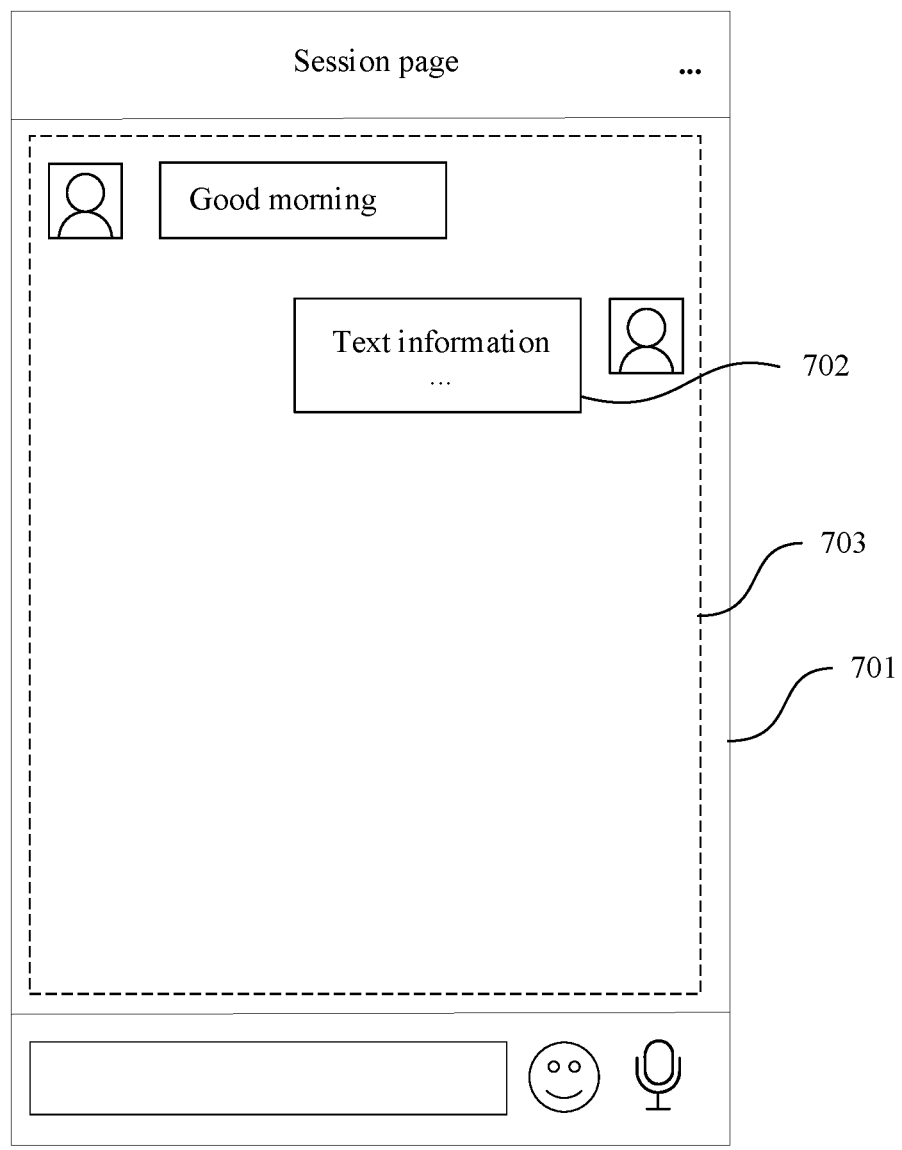
FIG. 7 is a schematic diagram of a text information display manner according to embodiment(s) of the present disclosure.

FIG. 7 is a schematic diagram of a text information display manner according to an embodiment of the present disclosure. Referring to FIG. 7, for example, a target page 701 is a session page. The server may perform speech recognition on speech data inputted by a user in the session page 701, return text information 702 corresponding to the speech data to a terminal, and display the text information in a session display region 703 of the target page 701.

The technical solution provided in this embodiment of the present disclosure is applicable to any scenario in which text information is desirable to be inputted. For example, this solution is further applicable to a search scenario. When searching for information, the user may only need to record a speech without inputting search content word by word. Information input efficiency can be effectively improved by using a speech recognition technology provided in this solution.

Figure 8:
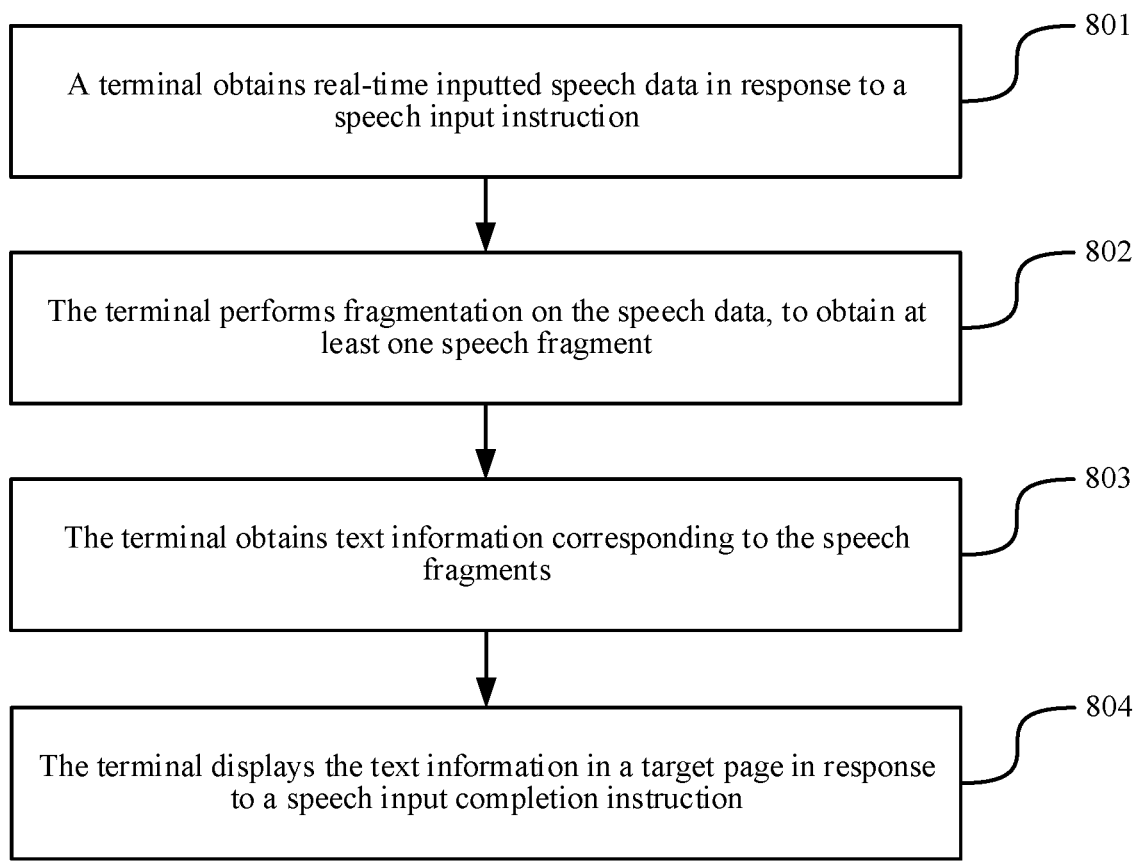
FIG. 8 is a schematic flowchart of a text information display method according to embodiment(s) of the present disclosure.

In this embodiment of the present disclosure, the speech recognition technology is deployed in the server. The server may be a back-end server of a target application, and the server may provide a speech recognition service to the target application. For example, when the target application is an instant messaging application, the user may record speech information in a terminal in the form of speech input, and the server coverts the speech information into text information, to improve the information input efficiency. FIG. 8 is a flowchart of a text information display method according to an embodiment of the present disclosure. Referring to FIG. 8, the method may include the following steps.

801. A terminal obtains real-time inputted speech data in response to a speech input instruction.

The terminal may be a computing device used by a user. For example, the terminal may be a mobile phone, a computer, or the like, and the target application may be installed and run on the terminal.

In certain embodiment(s), when detecting a trigger operation of the user on a speech input control, the terminal may obtain speech data inputted by the user in real time. The trigger operation may be a tap/click operation, a touch and hold operation, or the like, which is not limited in this embodiment of the present disclosure.

802. The terminal performs fragmentation on the speech data, to obtain at least one speech fragment.

In certain embodiment(s), the terminal may perform fragmentation on the speech data inputted by the user according to a target period. The target period may be set by the developer, which is not limited in this embodiment of the present disclosure.

803. The terminal obtains text information corresponding to the speech fragments.

In certain embodiment(s), the terminal may send a speech recognition request to the server, the speech recognition request carrying at least one speech fragment. For example, after obtaining a speech fragment, the terminal may package the speech fragment by using a network protocol and send a speech recognition request and packaged speech data to the server. The terminal may receive the text information returned by the server, the text information being determined by the server based on hidden layer features of speech segments in the speech fragment.

In certain embodiment(s), after obtaining speech data, the terminal may perform real-time recognition on the speech data, to obtain text information. This is not limited in this embodiment of the present disclosure. In this embodiment of the present disclosure, a step in which the server performs speech recognition is used as an example for description.

The speech recognition method is similar to the speech recognition method in step 202 to step 207. Details are not described herein again.

804. The terminal displays the text information in a target page in response to a speech input completion instruction.

Figure 9:
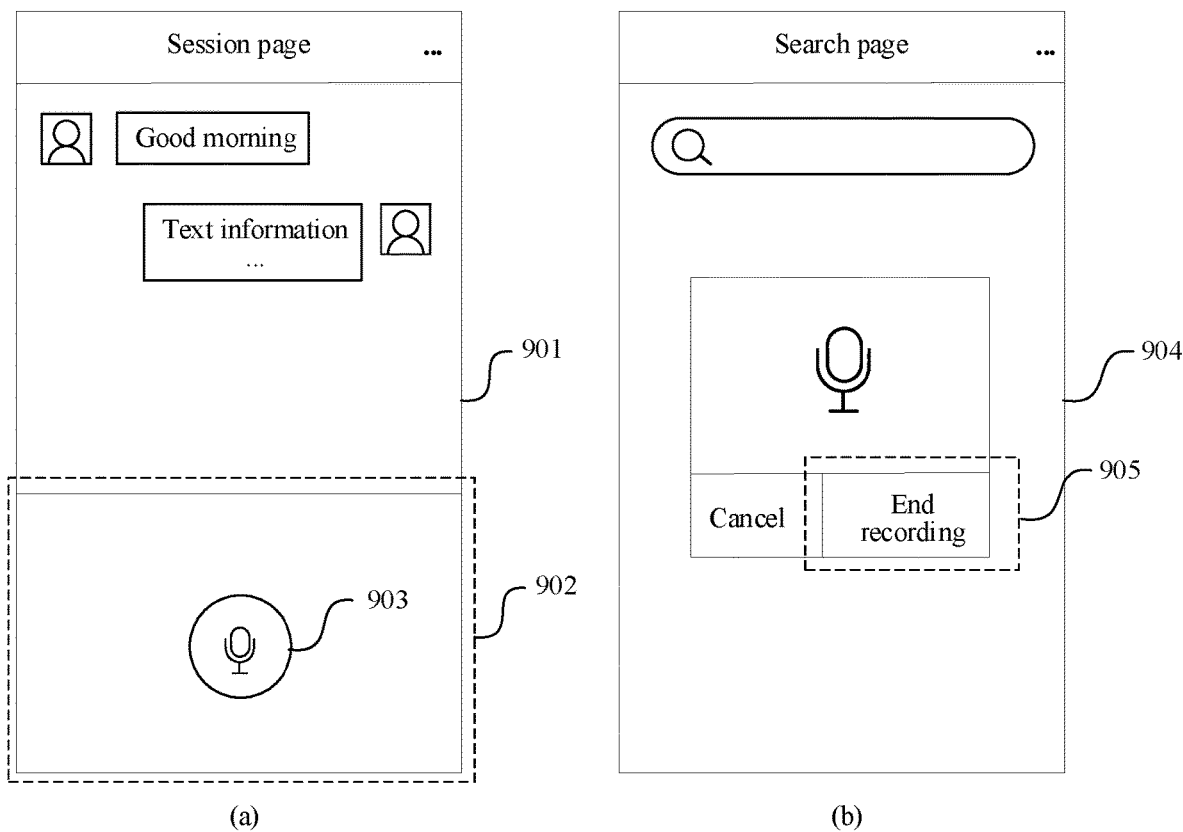
FIG. 9 is a schematic diagram of a target page according to embodiment(s) of the present disclosure.

The target page may be a session page, and the terminal may display obtained text information in the session page. In certain embodiment(s), a speech input control may be displayed in the session page. When detecting a trigger operation of the user on the speech input control, the terminal may display a speech input window in the session page, the user may record speech data when the speech input window is displayed, and the terminal acquires the speech data by using a speech acquisition device (for example, a microphone). When the user triggers a speech input completion instruction, the terminal may hide the speech input window, and the terminal may obtain all text information corresponding to a current speech input from the server and display the text information in the session page (that is, the target page). FIG. 9 is a schematic diagram of a target page according to an embodiment of the present disclosure. For example, in (a) in FIG. 9, a target page 901 may include a speech input window 902, and a speech recording control 903 may be displayed in the speech input window 902. When detecting that a user presses the speech recording control 903, the terminal may start to acquire speech information inputted by the user. When releasing the speech recording control 903, the user may trigger a speech input completion instruction, and the terminal may obtain text information corresponding to currently inputted speech data and display the text information in the target page.

In this embodiment of the present disclosure, the target page may alternatively be a search page. The terminal may display the obtained text information in the search page. In certain embodiment(s), the user may record search content in the form of speech during searching. When a speech input completion instruction is received, text information corresponding to currently inputted speech data is obtained and is displayed in a search box of the search page. Referring to (b) in FIG. 9, after speech recording is ended, a recording end control 905 is displayed in the target page 904. The user may trigger a speech input completion instruction when clicking/tapping the recording end control 905. the terminal may obtain text information corresponding to currently inputted speech data and display the text information in the target page, for example, display the text information in the search box.

The speech input completion instruction may alternatively be triggered in another manner, which is not limited in this embodiment of the present disclosure.

Figure 10:
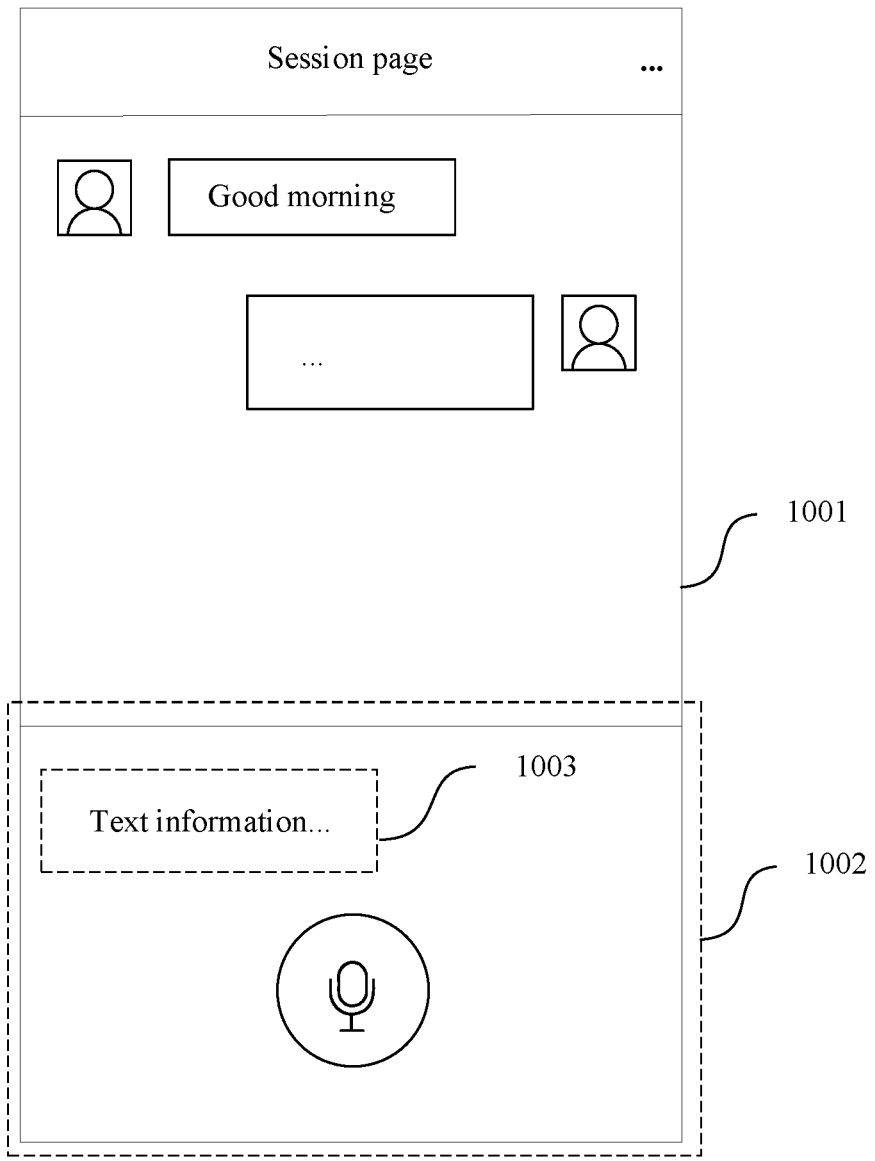
FIG. 10 is a schematic diagram of a text information display effect according to embodiment(s) of the present disclosure.

In certain embodiment(s), the terminal may display text information corresponding to speech data that has been inputted when the user inputs a speech. FIG. 10 is a schematic diagram of a text information display effect according to an embodiment of the present disclosure. For example, the target page is a session page. A speech input window 1002 may be displayed in a session page 1001, and the speech input window 1002 may include a text information display region 1003. After the terminal sends a speech fragment to the server, the server may return a recognition result of speech data in the speech fragment in real time, and the terminal may display the recognition result corresponding to the speech fragment in the text information display region 1003. After the user performs speech input, the terminal may send a speech input completion instruction to the server. The server ends speech recognition, and the terminal may obtain all recognition results of current speech recognition, that is, text information corresponding to currently inputted speech data. The terminal may hide a speech input window 1002 and display the text information in the session page 1001. For example, the target page may be the session page.

In certain embodiment(s), the terminal may display the text information corresponding to the speech data after speech input is performed. That is, the terminal may obtain all text information from the server based on speech data inputted by the user and a speech input completion instruction and display the text information in the target page.

The description of the text information display manner is merely an exemplary description. A specific text information display manner is not limited in this embodiment of the present disclosure.

According to the technical solution provided in this embodiment of the present disclosure, a speech recognition solution is stored in a cloud service and is assigned to a user of the cloud service as a basic technology, so that the user can perform fast textual input by speaking directly without having to use an input method such as pinyin or strokes when inputting text information. In addition, by using the speech recognition solution, real-time recognition may be performed on a streaming speech, that is, a real-time inputted speech, to shorten a recognition time and improve the speech recognition efficiency.

The technical solutions may be combined in any suitable order to form embodiments of the present disclosure, and details are not described herein again.

Figure 11:
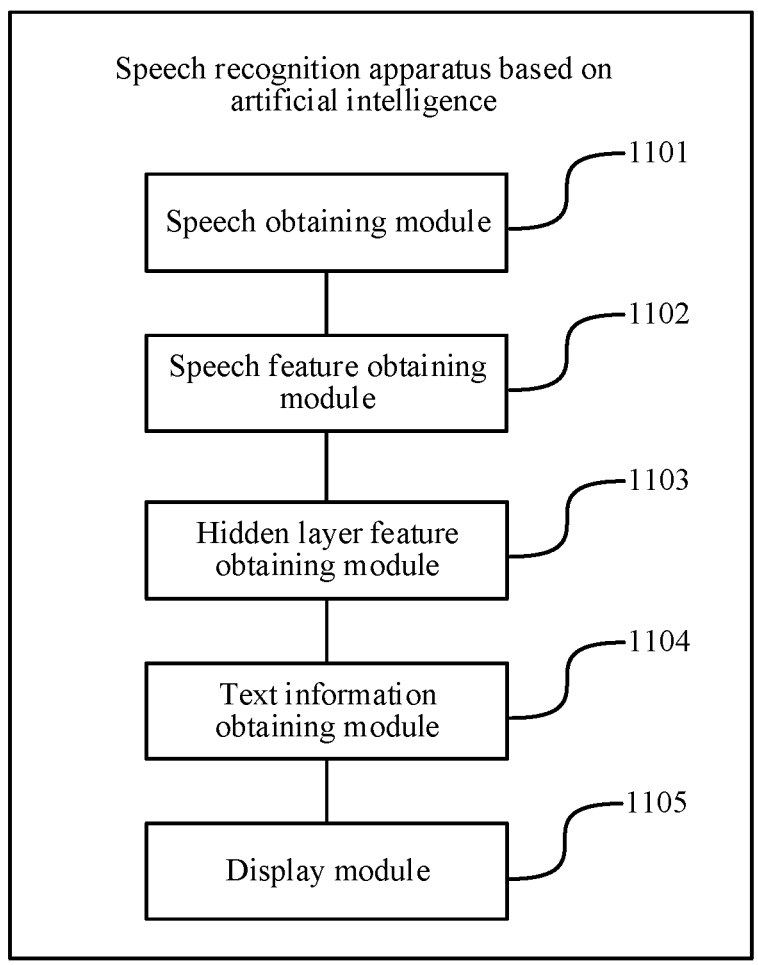
FIG. 11 is a schematic structural diagram of a speech recognition apparatus according to embodiment(s) of the present disclosure.

FIG. 11 is a schematic structural diagram of a speech recognition apparatus according to an embodiment of the present disclosure. The apparatus may implement all or a part of a terminal or a server by using hardware, software, or a combination thereof. The apparatus includes: a speech obtaining module 1101, configured to obtain to-be-recognized speech data; a speech feature obtaining module 1102, configured to perform feature extraction on the speech data, to obtain speech features of at least two speech segments in the speech data; a hidden layer feature obtaining module 1103, configured to input the speech features of the at least two speech segments into the speech recognition model, and process or sequentially process the speech features of the speech segments by using n cascaded hidden layers in the speech recognition model, to obtain hidden layer features of the speech segments, a hidden layer feature of an ith speech segment being determined based on speech features of n speech segments located after the ith speech segment in a time sequence and a speech feature of the ith speech segment; and a text information obtaining module 1104, configured to obtain text information corresponding to the speech data based on the hidden layer features of the speech segments.

In certain embodiment(s), the speech feature obtaining module 1102 is configured to: perform spectrum feature extraction on the speech data, to obtain spectrum features corresponding to speech frames in the speech data; and splice a spectrum feature corresponding to at least one speech frame belonging to a same speech segment, to form the speech feature.

In certain embodiment(s), the hidden layer feature obtaining module 1103 is configured to: input the speech features of the at least two speech segments into the speech recognition model; input a speech feature of an ith speech segment and a speech feature of an $(i+1)^{th}$ speech segment into a first hidden layer in the speech recognition model, to output an initial hidden layer feature of the ith speech segment; input the initial hidden layer feature of the ith speech segment and an initial hidden layer feature of the $(i+1)^{th}$ speech segment into a first intermediate hidden layer in the speech recognition model, to output a first intermediate hidden layer feature of the ith speech segment, the initial hidden layer feature of the $(i+1)^{th}$ speech segment being obtained by the first hidden layer through an operation based on the speech feature of the $(i+1)^{th}$ speech segment and a speech feature of an $(i+2)^{th}$ speech segment; input a jth intermediate hidden layer feature of the ith speech segment and a jth intermediate hidden layer feature of the $(i+1)^{th}$ speech segment into a $(j+1)^{th}$ intermediate hidden layer in the speech recognition model, to output a $(j+1)^{th}$ intermediate hidden layer feature of the ith speech segment, the jth intermediate hidden layer feature of the $(i+1)^{th}$ speech segment being obtained by the jth intermediate hidden layer through an operation based on a $(j-1)^{th}$ intermediate hidden layer feature of the $(i+1)^{th}$ speech segment and a $(j-1)^{th}$ intermediate hidden layer feature of the $(i+2)^{th}$ speech segment; and input a lastest intermediate hidden layer feature of the ith speech segment into a lastest hidden layer in the speech recognition model, to output a hidden layer feature of the ith speech segment, i and j being positive integers, and a 0th intermediate hidden layer feature being the initial hidden layer feature.

In certain embodiment(s), the hidden layer feature obtaining module 1103 is configured to: input a feature of the ith speech segment into a kth hidden layer in the speech recognition model, and perform a forward operation on the feature of the ith speech segment by using the kth hidden layer, to obtain a first feature; perform a reverse operation on the feature of the ith speech segment and a feature of the $(i+1)^{th}$ speech segment by using the kth hidden layer, to obtain a second feature; and splice the first feature and the second feature, to obtain a feature outputted by the kth hidden layer, k being a positive integer.

In certain embodiment(s), the hidden layer feature obtaining module 1103 is configured to: obtain a second target quantity of speech frames from the $(i+1)^{th}$ speech segment; and perform the reverse operation on the feature corresponding to the ith speech segment and features corresponding to the second target quantity of speech frames by using the kth hidden layer, to obtain the second feature.

In certain embodiment(s), a pronunciation dictionary and a language model are further set in the apparatus; and the text information obtaining 1104 module is configured to: determine phoneme information corresponding to the speech segments based on the hidden layer features; and determine the text information corresponding to the speech data based on the phoneme information, the pronunciation dictionary, and the language model, the pronunciation dictionary being used for indicating a mapping relationship between phonemes and pronunciations, and the language model being used for determining probability values corresponding to phrases forming the text information.

In certain embodiment(s), the apparatus further includes: a display module 1105, configured display the text information corresponding to the speech data in a target page.

According to the apparatus provided in this embodiment of the present disclosure, speech features of at least two speech segments are extracted from speech data, and then the speech features of the speech segments are learned and recognized by invoking a speech recognition model, a hidden layer feature of each speech segment being obtained by learning based on features of subsequent speech segments, so that the hidden layer feature of the speech segment learns following information, and finally recognized text information is more smooth in language expression and more accurate in semantics, thereby improving accuracy of speech recognition.

Figure 12:
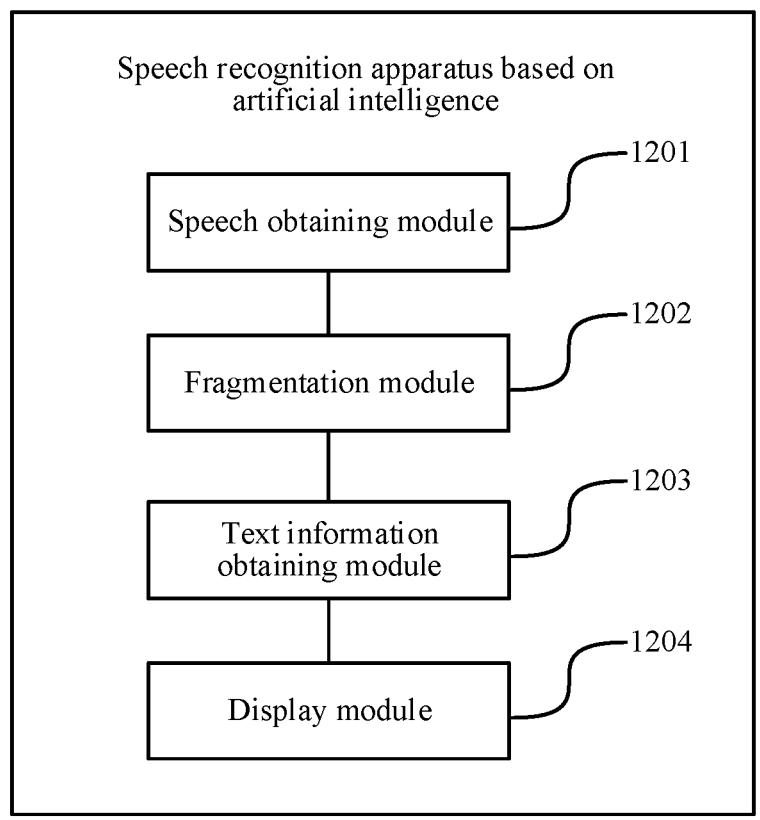
FIG. 12 is a schematic structural diagram of a speech recognition apparatus according to embodiment(s) of the present disclosure.

FIG. 12 is a schematic structural diagram of a speech recognition apparatus according to an embodiment of the present disclosure. Referring to FIG. 12, the apparatus includes: a speech obtaining module 1201, configured to obtain real-time inputted speech data in response to a speech input instruction; a fragmentation module 1202, configured to perform fragmentation on the speech data, to obtain at least one speech fragment; a text information obtaining module 1203, configured to obtain text information corresponding to the speech fragments, the text information being obtained by using the speech recognition method according to any one of claims 1 to 6; and a display module 1204, configured to display the text information in a target page in response to a speech input completion instruction.

In certain embodiment(s), the text information obtaining module 1203 is configured to: transmit a speech recognition request to a server, the speech recognition request carrying the at least one speech fragment; and receive the text information returned by the server, the text information being determined by the server based on hidden layer features of speech segments in the speech fragment.

According to the apparatus provided in this embodiment of the present disclosure, a server extracts speech features of at least two speech segments from speech data, and then learns and recognizes the speech features of the speech segments by invoking a speech recognition model, a hidden layer feature of each speech segment being obtained by learning based on features of subsequent speech segments, so that the hidden layer feature of the speech segment learns following information, and finally recognized text information is more smooth in language expression and more accurate in semantics, thereby improving accuracy of speech recognition.

The speech recognition apparatus provided in the embodiments is illustrated with an example of division of the functional modules when performing speech recognition. In actual implementation, the functions may be allocated to apparatus performed by different functional modules, that is, the internal structure of the apparatus is divided into different functional modules, to implement all or some of the functions described above. In addition, embodiments of the speech recognition apparatus and embodiments of the speech recognition method provided above belong to the same conception. For the specific implementation process, reference may be made to the method embodiments, and details are not repeated herein.

Figure 13:
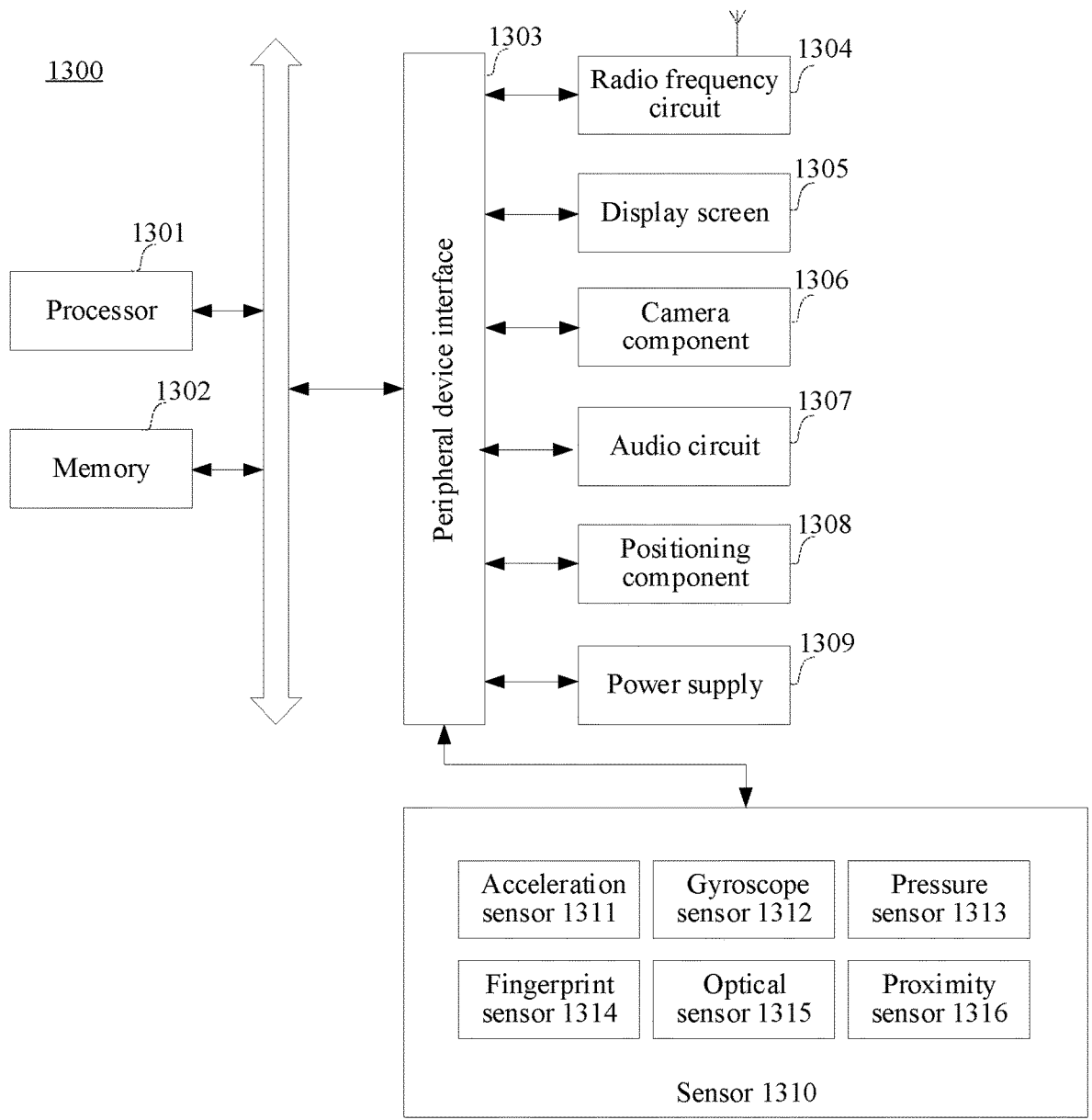
FIG. 13 is a schematic structural diagram of a terminal according to embodiment(s) of the present disclosure.

The computing device provided in the technical solution may be implemented as a terminal or a server. For example, FIG. 13 is a schematic structural diagram of a terminal according to an embodiment of the present disclosure. The terminal 1300 may be a smartphone, a tablet computer, a Moving Picture Experts Group Audio Layer III (MP3) player, a Moving Picture Experts Group Audio Layer IV (MP4) player, a notebook computer, or a desktop computer. The terminal 1300 may also be referred to as another name such as user equipment, a portable terminal, a laptop terminal, or a desktop terminal.

Generally, the terminal 1300 includes one or more processors 1301 and one or more memories 1302.

The processor 1301 may include one or more processing cores, for example, a 4-core processor or an 8-core processor. The processor 1301 may be implemented in at least one hardware form of digital signal processor (DSP), a field programmable gate array (FPGA), and a programmable logic array (PLA). The processor 1301 may alternatively include a main processor and a coprocessor. The main processor is configured to process data in an active state, also referred to as a central processing unit (CPU). The coprocessor is a low-power processor configured to process data in a standby state. In some embodiments, the processor 1301 may be integrated with a graphics processing unit (GPU). The GPU is configured to render and draw content that may need to be displayed on a display screen. In some embodiments, the processor 1301 may further include an artificial intelligence (AI) processor. The AI processor is configured to process computing operations related to machine learning.

The memory 1302 may include one or more computer-readable storage media. The computer-readable storage medium may be non-transient. The memory 1302 may further include a high-speed random access memory and a non-volatile memory, for example, one or more disk storage devices or flash storage devices. In some embodiments, a non-transient computer-readable storage medium in the memory 1302 is configured to store at least one piece of program code, the at least one piece of program code being configured to be executed by the processor 1301 to implement the speech recognition method provided in the method embodiments of the present disclosure.

In some embodiments, the terminal 1300 may include: a peripheral device interface 1303 and at least one peripheral device. The processor 1301, the memory 1302, and the peripheral device interface 1303 may be connected by using a bus or a signal cable. Each peripheral device may be connected to the peripheral device interface 1303 by using a bus, a signal cable, or a circuit board. In certain embodiment(s), the peripheral device includes: at least one of a radio frequency (RF) circuit 1304, a display screen 1305, a camera component 1306, an audio circuit 1307, a positioning component 1308, or a power supply 1309.

The peripheral device interface 1303 may be configured to connect at least one peripheral device related to input/output (I/O) to the processor 1301 and the memory 1302. In some embodiments, the processor 1301, the memory 1302, and the peripheral device interface 1303 are integrated on the same chip or the same circuit board. In some other embodiments, any or both of the processor 1301, the memory 1302, and the peripheral device interface 1303 may be implemented on an independent chip or circuit board. This is not limited in this embodiment.

The RF circuit 1304 is configured to receive and transmit an RF signal, which is also referred to as an electromagnetic signal. The RF circuit 1304 communicates with a communication network and other communication devices through the electromagnetic signal. The RF circuit 1304 converts an electrical signal into an electromagnetic signal for transmission, or converts a received electromagnetic signal into an electrical signal. In certain embodiment(s), the RF circuit 1304 includes: an antenna system, an RF transceiver, one or more amplifiers, a tuner, an oscillator, a digital signal processor, a codec chip set, a subscriber identity module card, and the like. The RF circuit 1304 may communicate with other terminals by using at least one wireless communication protocol. The wireless communication protocol includes, but is not limited to: a metropolitan area network, generations of mobile communication networks (2G, 3G, 4G, and 5G), a wireless local area network and/or a wireless fidelity (Wi-Fi) network. In some embodiments, the RF circuit 1304 may further include a circuit related to near field communication (NFC), which is not limited in the present disclosure.

The display screen 1305 is configured to display a user interface (UI). The UI may include a graph, a text, an icon, a video, and any combination thereof. When the display screen 1305 is a touchscreen, the display screen 1305 is further capable of acquiring a touch signal on or above a surface of the display screen 1305. The touch signal may be inputted into the processor 1301 as a control signal for processing. In this implementation, the display screen 1305 may be further configured to provide a virtual button and/or a virtual keyboard that are/is also referred to as a soft button and/or a soft keyboard. In some embodiments, there may be one display screen 1305, disposed on a front panel of the terminal 1300. In other embodiments, there may be at least two display screens 1305 that are respectively disposed on different surfaces of the terminal 1300 or folded. In some embodiments, the display screen 1305 may be a flexible display screen disposed on a curved surface or a folded surface of the terminal 1300. Even, the display screen 1305 may be further set to have a non-rectangular irregular graph, that is, a special-shaped screen. The display screen 1305 may be manufactured by using a material such as a liquid crystal display (LCD), an organic light-emitting diode (OLED), or the like.

The camera component 1306 is configured to acquire an image or a video. In certain embodiment(s), the camera component 1306 includes a front-facing camera and a rear-facing camera. Generally, the front-facing camera is disposed on the front panel of the terminal, and the rear-facing camera is disposed on a back surface of the terminal. In some embodiments, there are at least two rear cameras, which are respectively any of a main camera, a depth-of-field camera, a wide-angle camera, or a telephoto camera, to implement background blur through fusion of the main camera and the depth-of-field camera, panoramic photographing and virtual reality (VR) photographing through fusion of the main camera and the wide-angle camera, or other fusion photographing functions. In some embodiments, the camera component 1306 may further include a flash. The flash may be a single color temperature flash or a double color temperature flash. The double color temperature flash is a combination of a warm light flash and a cold light flash, and may be used for light compensation under different color temperatures.

The audio circuit 1307 may include a microphone and a speaker. The speaker is configured to acquire sound waves of a user and an environment, and convert the sound waves into electric signals and input the electrical signals into the processor 1301 for processing, or input the electrical signals into the RF circuit 1304 to implement speech communication. For the purpose of stereo sound acquisition or noise reduction, there may be a plurality of microphones, respectively disposed at different parts of the terminal 1300. The microphone may be further a microphone array or an omnidirectional acquisition microphone. The loudspeaker is configured to convert electric signals from the processor 1301 or the RF circuit 1304 into sound waves. The loudspeaker may be a thin-film loudspeaker or a piezoelectric ceramic loudspeaker. When the loudspeaker is the piezoelectric ceramic loudspeaker, the speaker can not only convert an electrical signal into sound waves audible to a human being, but also convert an electrical signal into sound waves inaudible to the human being for ranging and other purposes. In some embodiments, the audio circuit 1307 may also include an earphone jack.

The positioning component 1308 is configured to position a current geographic position of the terminal 1300, to implement navigation or a location based service (LBS). The positioning component 1308 may be a positioning component based on the Global Positioning System (GPS) of the United States, the BeiDou System of China, the GLONASS System of Russia, or the GALILEO System of the European Union.

The power supply 1309 is configured to supply power to components in the terminal 1300. The power supply 1309 may be an alternating current, a direct current, a primary battery, or a rechargeable battery. In response to determining that the power supply 1309 includes the rechargeable battery, the rechargeable battery may support wired charging or wireless charging. The rechargeable battery may be further configured to support a fast charging technology.

In some embodiments, the terminal 1300 further includes one or more sensors 1310. The one or more sensors 1310 include, but are not limited to, an acceleration sensor 1311, a gyroscope sensor 1312, a pressure sensor 1313, a fingerprint sensor 1314, an optical sensor 1315, and a proximity sensor 1316.

The acceleration sensor 1311 may detect a magnitude of acceleration on three coordinate axes of a coordinate system established with the terminal 1300. For example, the acceleration sensor 1311 may be configured to detect components of gravity acceleration on the three coordinate axes. The processor 1301 may control, according to a gravity acceleration signal collected by the acceleration sensor 1311, the display screen 1305 to display the user interface in a frame view or a portrait view. The acceleration sensor 1311 may be further configured to acquire motion data of a game or a user.

The gyroscope sensor 1312 may detect a body direction and a rotation angle of the terminal 1300. The gyroscope sensor 1312 may cooperate with the acceleration sensor 1311 to acquire a 3D action by the user on the terminal 1300. The processor 1301 may implement the following functions according to the data acquired by the gyroscope sensor 1312: motion sensing (such as changing the UI according to a tilt operation of the user), image stabilization at shooting, game control, and inertial navigation.

The pressure sensor 1313 may be disposed at a side frame of the terminal 1300 and/or a lower layer of the display screen 1305. When the pressure sensor 1313 is disposed at the side frame of the terminal 1300, a holding signal of the user on the terminal 1300 may be detected. The processor 1301 performs left/right hand recognition or a quick operation according to the holding signal acquired by the pressure sensor 1313. When the pressure sensor 1313 is disposed on the low layer of the display screen 1305, the processor 1301 controls, according to a pressure operation of the user on the display screen 1305, an operable control on the UI. The operable control includes at least one of a button control, a scroll-bar control, an icon control, and a menu control.

The fingerprint sensor 1314 is configured to acquire a fingerprint of a user, and the processor 1301 recognizes an identity of the user according to the fingerprint acquired by the fingerprint sensor 1314, or the fingerprint sensor 1314 recognizes the identity of the user based on the acquired fingerprint. When identifying that the user's identity is a trusted identity, the processor 1301 authorizes the user to perform related sensitive operations. The sensitive operations include: unlocking a screen, viewing encryption information, downloading software, paying and changing a setting, and the like. The fingerprint sensor 1314 may be disposed on a front face, a back face, or a side face of the terminal 1300. When a physical button or a vendor logo is disposed on the terminal 1300, the fingerprint 1314 may be integrated with the physical button or the vendor logo.

The optical sensor 1315 is configured to acquire ambient light intensity. In an embodiment, the processor 1301 may control display luminance of the display screen 1305 according to the ambient light intensity collected by the optical sensor 1315. In certain embodiment(s), in response to determining that the ambient light intensity is relatively high, the display brightness of the display screen 1305 is increased. In response to determining that the ambient light intensity is relatively low, the display brightness of the display screen 1305 is reduced. In another embodiment, the processor 1301 may further dynamically adjust a camera parameter of the camera component 1306 according to the ambient light intensity acquired by the optical sensor 1315.

The proximity sensor 1316, also referred to as a distance sensor, is generally disposed on the front panel of the terminal 1300. The proximity sensor 1316 is configured to acquire a distance between the user and the front surface of the terminal 1300. In an embodiment, when the proximity sensor 1316 detects that the distance between the user and the front surface of the terminal 1300 gradually becomes small, the display screen 1305 is controlled by the processor 1301 to switch from a screen-on state to a screen-off state When the proximity sensor 1316 detects that the distance between the user and the front surface of the terminal 1300 gradually increases, the display screen 1305 is controlled by the processor 1301 to switch from the screen-off state to the screen-on state.

A person skilled in the art may understand that the structure shown in FIG. 13 constitutes no limitation on the terminal 1300, and the terminal may include more or fewer components than those shown in the figure, or some components may be combined, or a different component deployment may be used.

Figure 14:
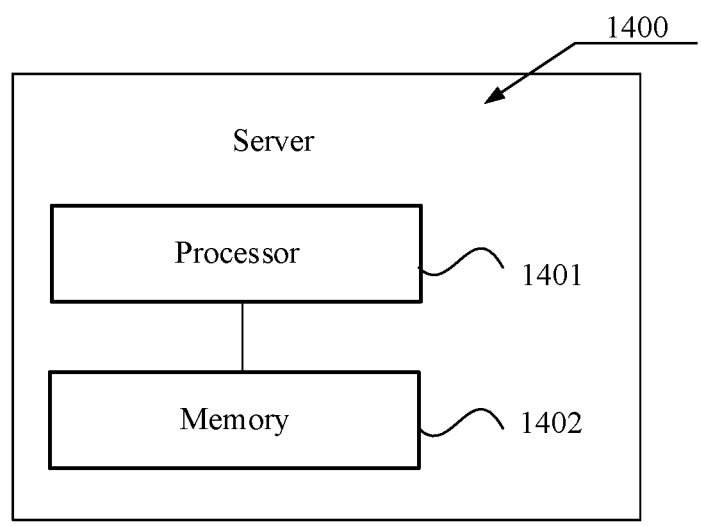
FIG. 14 is a schematic structural diagram of a server according to embodiment(s) of the present disclosure.

FIG. 14 is a schematic structural diagram of a server according to an embodiment of the present disclosure. The server 1400 may vary greatly because a configuration or performance varies, and may include one or more central processing units (CPU) 1401 and one or more memories 1402. The one or more memories 1402 store at least one piece of program code, and the at least one piece of program code is loaded and executed by the one or more processors 1401 to implement the methods provided in the various method embodiments. The server 1400 may also have a wired or wireless network interface, a keyboard, an input/output interface and other components to facilitate input/output. The server 1400 may also include other components for implementing device functions. Details are not described herein again.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

In an exemplary embodiment, a computer-readable storage medium, for example, a memory including at least one piece of program code is further provided. The at least one piece of program code may be executed by a processor to implement the speech recognition method in the embodiments. For example, the computer-readable storage medium may be a read-only memory (ROM), a RAM, a compact disc ROM (CD-ROM), a magnetic tape, a floppy disk, an optical data storage device, or the like.

A person of ordinary skill in the art may understand that all or some of the steps of the embodiments may be implemented by hardware or by a program instructing related hardware. The program may be stored in a computer-readable storage medium. The storage medium may be a read-only memory, a magnetic disk, an optical disc, or the like.

The embodiments are not intended to limit the present disclosure. Any modification, equivalent replacement, or improvement made within the spirit and principle of the present disclosure shall fall within the protection scope of the present disclosure.

What is claimed is:

1. A speech recognition method, applied to a computing device, a speech recognition model being set in the computing device, and the method comprising:
   obtaining speech data;
   performing feature extraction on the speech data, to obtain speech features of at least two speech segments in the speech data;
   inputting the speech features of the at least two speech segments into the speech recognition model, and processing the speech features of the speech segments by using n cascaded hidden layers in the speech recognition model, to obtain hidden layer features of the speech segments, comprising:
      inputting a $j^{th}$ intermediate hidden layer feature of an ith speech segment and a $j^{th}$ intermediate hidden layer feature of the $(i+1)^{th}$ speech segment into a $(j+1)^{th}$ intermediate hidden layer in the speech recognition model, to output a $(j+1)^{th}$ intermediate hidden layer feature of the $i^{th}$ speech segment, the $j^{th}$ intermediate hidden layer feature of the $(i+1)^{th}$ speech segment being obtained by the $j^{th}$ intermediate hidden layer through an operation based on: a speech feature of the $(i+1)^{th}$ speech segment and a speech feature of an $(i+2)^{th}$ speech segment in response to j being 0, and based on a $(j-1)^{th}$ intermediate hidden layer feature of the $(i+1)^{th}$ speech segment and a $(j-1)^{th}$ intermediate hidden layer feature of the $(i+2)^{th}$ speech segment in response to j being a positive integer, and both n and i are positive integers; and
   obtaining text information corresponding to the speech data based on the hidden layer features of the speech segments.

2. The method according to claim 1, wherein performing the feature extraction on the speech data comprises:
   performing spectrum feature extraction on the speech data, to obtain spectrum features corresponding to speech frames in the speech data; and
   splicing a spectrum feature corresponding to at least one speech frame belonging to a same speech segment, to form the speech feature.

3. The method according to claim 1, wherein inputting the speech features of the at least two speech segments into the speech recognition model further comprises:
   inputting the speech features of the at least two speech segments into the speech recognition model;
   inputting the speech feature of the $i^{th}$ speech segment and a speech feature of an $(i+1)^{th}$ speech segment into a first hidden layer in the speech recognition model, to output an initial hidden layer feature of the $i^{th}$ speech segment, wherein the first hidden layer is the $0^{th}$ intermediate hidden layer, and the initial hidden layer feature is the $0^{th}$ intermediate hidden layer feature;

and inputting a last intermediate hidden layer feature of the $i^{th}$ speech segment into a last hidden layer in the speech recognition model, to output the hidden layer feature of the $i^{th}$ speech segment.

4. The method according to claim 1, further comprising:
inputting a feature of the $i^{th}$ speech segment into a $k^{th}$ hidden layer in the speech recognition model, and performing a forward operation on the feature of the $i^{th}$ speech segment by using the $k^{th}$ hidden layer, to obtain a first feature;

performing a reverse operation on the feature of the $i^{th}$ speech segment and a feature of the $(i+1)^{th}$ speech segment by using the $k^{th}$ hidden layer, to obtain a second feature; and splicing the first feature and the second feature, to obtain a feature outputted by the $k^{th}$ hidden layer, k being a positive integer.

5. The method according to claim 4, wherein performing the reverse operation comprises:
obtaining a second target quantity of speech frames from the $(i+1)^{th}$ speech segment; and performing the reverse operation on the feature corresponding to the $i^{th}$ speech segment and features corresponding to the second target quantity of speech frames by using the $k^{th}$ hidden layer, to obtain the second feature.

6. The method according to claim 1, wherein a pronunciation dictionary and a language model are further set in the computing device, and wherein obtaining text information corresponding to the speech data comprises:
determining phoneme information corresponding to the speech segments based on the hidden layer features; and determining the text information corresponding to the speech data based on the phoneme information, the pronunciation dictionary, and the language model, the pronunciation dictionary being used for indicating a mapping relationship between phonemes and pronunciations, and the language model being used for determining probability values corresponding to phrases forming the text information.

7. The method according to claim 1, further comprising:
displaying the text information corresponding to the speech data in a target page.

8. A speech recognition apparatus, a speech recognition model being set in the apparatus, and the apparatus comprising: a memory storing computer program instructions; and a processor coupled to the memory and configured to execute the computer program instructions and perform:
obtaining speech data;

performing feature extraction on the speech data, to obtain speech features of at least two speech segments in the speech data;

inputting the speech features of the at least two speech segments into the speech recognition model, and processing the speech features of the speech segments by using n cascaded hidden layers in the speech recognition model, to obtain hidden layer features of the speech segments, comprising:
inputting a $j^{th}$ intermediate hidden layer feature of an $i^{th}$ speech segment and a $j^{th}$ intermediate hidden layer feature of the $(i+1)^{th}$ speech segment into a $(j+1)^{th}$ intermediate hidden layer in the speech recognition model, to output a $(j+1)^{th}$ intermediate hidden layer feature of the $i^{th}$ speech segment, the $j^{th}$ intermediate hidden layer feature of the $(i+1)^{th}$ speech segment being obtained by the $j^{th}$ intermediate hidden layer through an operation based on: a speech feature of the $(i+1)^{th}$ speech segment and a speech feature of an $(i+2)^{th}$ speech segment in response to j being 0, and based on a $(j-1)^{th}$ intermediate hidden layer feature of the $(i+1)^{th}$ speech segment and a $(j-1)^{th}$ intermediate hidden layer feature of the $(i+2)^{th}$ speech segment in response to j being a positive integer, and both n and i are positive integers; and obtaining text information corresponding to the speech data based on the hidden layer features of the speech segments.

9. The apparatus according to claim 8, wherein the processor is further configured to execute the computer program instructions and perform:
performing spectrum feature extraction on the speech data, to obtain spectrum features corresponding to speech frames in the speech data; and splicing a spectrum feature corresponding to at least one speech frame belonging to a same speech segment, to form the speech feature.

10. The apparatus according to claim 8, wherein the processor is further configured to execute the computer program instructions and perform:
inputting the speech features of the at least two speech segments into the speech recognition model;

inputting the speech feature of the $i^{th}$ speech segment and a speech feature of an $(i+1)^{th}$ speech segment into a first hidden layer in the speech recognition model, to output an initial hidden layer feature of the $i^{th}$ speech segment, wherein the first hidden layer is the $0^{th}$ intermediate hidden layer, and the initial hidden layer feature is the $0^{th}$ intermediate hidden layer feature;

and inputting a last intermediate hidden layer feature of the $i^{th}$ speech segment into a last hidden layer in the speech recognition model, to output the hidden layer feature of the $i^{th}$ speech segment.

11. The apparatus according to claim 8, wherein the processor is further configured to execute the computer program instructions and perform:
inputting a feature of the $i^{th}$ speech segment into a $k^{th}$ hidden layer in the speech recognition model, and perform a forward operation on the feature of the $i^{th}$ speech segment by using the $k^{th}$ hidden layer, to obtain a first feature;

performing a reverse operation on the feature of the $i^{th}$ speech segment and a feature of the $(i+1)^{th}$ speech segment by using the $k^{th}$ hidden layer, to obtain a second feature; and splicing the first feature and the second feature, to obtain a feature outputted by the $k^{th}$ hidden layer, k being a positive integer.

12. The apparatus according to claim 11, wherein the processor is further configured to execute the computer program instructions and perform:
obtaining a second target quantity of speech frames from the $(i+1)^{th}$ speech segment; and performing the reverse operation on the feature corresponding to the $i^{th}$ speech segment and features corresponding to the second target quantity of speech frames by using the $k^{th}$ hidden layer, to obtain the second feature.

13. The apparatus according to claim 8, wherein a pronunciation dictionary and a language model are further set in the apparatus, and wherein the processor is further configured to execute the computer program instructions and perform:

determining phoneme information corresponding to the speech segments based on the hidden layer features; and determining the text information corresponding to the speech data based on the phoneme information, the pronunciation dictionary, and the language model, the pronunciation dictionary being used for indicating a mapping relationship between phonemes and pronunciations, and the language model being used for determining probability values corresponding to phrases forming the text information.

14. The apparatus according to claim 8, wherein the processor is further configured to execute the computer program instructions and perform:

display the text information corresponding to the speech data in a target page.

15. A non-transitory computer-readable storage medium storing computer program instructions executable by at least one processor to perform:

obtaining speech data;

performing feature extraction on the speech data, to obtain speech features of at least two speech segments in the speech data;

inputting the speech features of the at least two speech segments into the speech recognition model, and processing the speech features of the speech segments by using n cascaded hidden layers in the speech recognition model, to obtain hidden layer features of the speech segments, comprising:

inputting a $j^{th}$ intermediate hidden layer feature of an $i^{th}$ speech segment and a $j^{th}$ intermediate hidden layer feature of the $(i+1)^{th}$ speech segment into a $(j+1)^{th}$ intermediate hidden layer in the speech recognition model, to output a $(j+1)^{th}$ intermediate hidden layer feature of the $i^{th}$ speech segment, the $j^{th}$ intermediate hidden layer feature of the $(i+1)^{th}$ speech segment being obtained by the $j^{th}$ intermediate hidden layer through an operation based on: a speech feature of the $(i+1)^{th}$ speech segment and a speech feature of an $(i+2)^{th}$ speech segment in response to j being 0, and based on a $(j-1)^{th}$ intermediate hidden layer feature of the $(i+1)^{th}$ speech segment and a $(j-1)^{th}$ intermediate hidden layer feature of the $(i+2)^{th}$ speech segment in response to j being a positive integer, and both n and i are positive integers; and obtaining text information corresponding to the speech data based on the hidden layer features of the speech segments.

16. The non-transitory computer-readable storage medium according to claim 15, wherein performing the feature extraction on the speech data includes:

performing spectrum feature extraction on the speech data, to obtain spectrum features corresponding to speech frames in the speech data; and splicing a spectrum feature corresponding to at least one speech frame belonging to a same speech segment, to form the speech feature.

17. The non-transitory computer-readable storage medium according to claim 15, wherein inputting the speech features of the at least two speech segments into the speech recognition model includes:

inputting the speech features of the at least two speech segments into the speech recognition model;

inputting the speech feature of the $i^{th}$ speech segment and a speech feature of an $(i+1)^{th}$ speech segment into a first hidden layer in the speech recognition model, to output an initial hidden layer feature of the $i^{th}$ speech segment, wherein the first hidden layer is the $0^{th}$ intermediate hidden layer, and the initial hidden layer feature is the $0^{th}$ intermediate hidden layer feature; and inputting a last intermediate hidden layer feature of the $i^{th}$ speech segment into a last hidden layer in the speech recognition model, to output the hidden layer feature of the $i^{th}$ speech segment.

18. The non-transitory computer-readable storage medium according to claim 15, wherein the computer program instructions are further executable by the at least one processor to perform:

inputting a feature of the $i^{th}$ speech segment into a $k^{th}$ hidden layer in the speech recognition model, and performing a forward operation on the feature of the $i^{th}$ speech segment by using the $k^{th}$ hidden layer, to obtain a first feature;

performing a reverse operation on the feature of the $i^{th}$ speech segment and a feature of the $(i+1)^{th}$ speech segment by using the $k^{th}$ hidden layer, to obtain a second feature; and splicing the first feature and the second feature, to obtain a feature outputted by the $k^{th}$ hidden layer, k being a positive integer.

19. The non-transitory computer-readable storage medium according to claim 18, wherein performing the reverse operation includes:

obtaining a second target quantity of speech frames from the $(i+1)^{th}$ speech segment; and performing the reverse operation on the feature corresponding to the $i^{th}$ speech segment and features corresponding to the second target quantity of speech frames by using the $k^{th}$ hidden layer, to obtain the second feature.

20. The non-transitory computer-readable storage medium according to claim 15, wherein a pronunciation dictionary and a language model are further set in the computing device, and wherein the computer program instructions are further executable by the at least one processor to perform:

determining phoneme information corresponding to the speech segments based on the hidden layer features; and determining the text information corresponding to the speech data based on the phoneme information, the pronunciation dictionary, and the language model, the pronunciation dictionary being used for indicating a mapping relationship between phonemes and pronunciations, and the language model being used for determining probability values corresponding to phrases forming the text information.

* * * * *